US 7,080,154 B1

(12) United States Patent
Inoue et al.

(10) Patent No.: US 7,080,154 B1
(45) Date of Patent: Jul. 18, 2006

(54) COMMUNICATION SCHEME FOR REALIZING EFFECTIVE DATA INPUT/SETUP IN COMPACT SIZE PORTABLE TERMINAL DEVICE USING LOCALLY CONNECTED NEARBY COMPUTER DEVICE

(75) Inventors: Atsushi Inoue, Kanagawa (JP); Yasuro Shobatake, Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/437,496

(22) Filed: Nov. 10, 1999

(30) Foreign Application Priority Data

Nov. 10, 1998 (JP) .................................. 10-319572

(51) Int. Cl.
*G06F 15/16* (2006.01)
(52) U.S. Cl. ..................... 709/234; 709/217; 379/93.01
(58) Field of Classification Search ........ 709/217–219, 709/245, 236, 249, 228, 203, 227, 232, 234; 345/157, 751, 163; 455/3.01; 379/93.01, 379/93.24
See application file for complete search history.

(56) References Cited

U.S. PATENT DOCUMENTS

| 5,796,394 | A | * | 8/1998 | Wicks et al. ................. 345/751 |
| 5,838,926 | A | * | 11/1998 | Yamagishi ................... 709/249 |
| 5,930,472 | A | * | 7/1999 | Smith .......................... 709/203 |
| 6,065,120 | A | * | 5/2000 | Laursen et al. ............. 709/227 |
| 6,072,468 | A | * | 6/2000 | Hocker et al. .............. 345/157 |
| 6,112,244 | A | * | 8/2000 | Moore et al. ................ 709/228 |
| 6,137,476 | A | * | 10/2000 | Hocker et al. .............. 345/163 |
| 6,243,739 | B1 | * | 6/2001 | Schwartz et al. ........... 709/219 |
| 6,249,516 | B1 | * | 6/2001 | Brownrigg et al. ......... 370/338 |
| 6,272,545 | B1 | * | 8/2001 | Flanagin et al. ............ 709/228 |
| 6,278,454 | B1 | * | 8/2001 | Krishnan ..................... 345/846 |
| 6,397,259 | B1 | * | 5/2002 | Lincke et al. ............... 709/236 |
| 6,415,330 | B1 | * | 7/2002 | Okanoue ..................... 709/245 |
| 6,473,609 | B1 | * | 10/2002 | Schwartz et al. ........... 455/406 |
| 6,622,174 | B1 | * | 9/2003 | Ukita et al. ................. 709/206 |
| 6,694,366 | B1 | * | 2/2004 | Gernert et al. .............. 709/227 |

FOREIGN PATENT DOCUMENTS

| JP | 7-175547 A | 7/1995 |
| JP | 10-021060 A | 1/1998 |
| JP | 10-275132 | 10/1998 |
| JP | 2000-505621 A | 5/2000 |

(Continued)

OTHER PUBLICATIONS

Kazuki Kasahara et al., "Detailed Analysis, Windows CE Japanese Version", Mobile PC, Sep. 1997, pp. 42-54, vol. 3, No. 9.

*Primary Examiner*—William C. Vaughn, Jr.
*Assistant Examiner*—Phouc H. Nguyen
(74) *Attorney, Agent, or Firm*—Foley & Lardner LLP

(57) ABSTRACT

A communication scheme in which it becomes possible to improve handling of a user interface or omit tedious operations in a portable terminal device by cooperating the computer device with the portable terminal device is disclosed. The portable terminal device obtains a prescribed information regarding the computer network that is necessary or utilizable in operating an application program to be operated on the portable terminal device by being connected to the computer network, from the computer device connected to the portable terminal device via the local network, carries out a prescribed processing for the application program according to at least a part of the prescribed information, and executes the application program by using a result of the prescribed processing and being connected to the computer network.

13 Claims, 25 Drawing Sheets

FOREIGN PATENT DOCUMENTS

WO 9-190353 A 7/1997
WO WO 97/32439 A2 9/1997

* cited by examiner

FIG.6A

QUERY COMMAND

| UDP header ||
|---|---|
| Length | Reserved |
| Command ||

[Command field]
Get-Web-Browser-Name:1
Get-Web-Browser-Bookmark:2
Get-Web-Browser-Setup:3
Get-IPtel-Name:4
Get-IPtel-numbers:5
Get-Mailer-Name:6
Get-Mailer-addresses:7

FIG.6B

REPLY COMMAND

| UDP header ||
|---|---|
| Length | Reserved |
| Command ||
| Extension ||

[Command field]
Get-Web-Browser-Name:1
Get-Web-Browser-Bookmark:2
Get-Web-Browser-Setup:3
Get-IPtel-Name:4
Get-IPtel-numbers:5
Get-Mailer-Name:6
Get-Mailer-addresses:7

PARAMETER LIST REQUEST COMMAND

PARAMETER LIST REPLY COMMAND

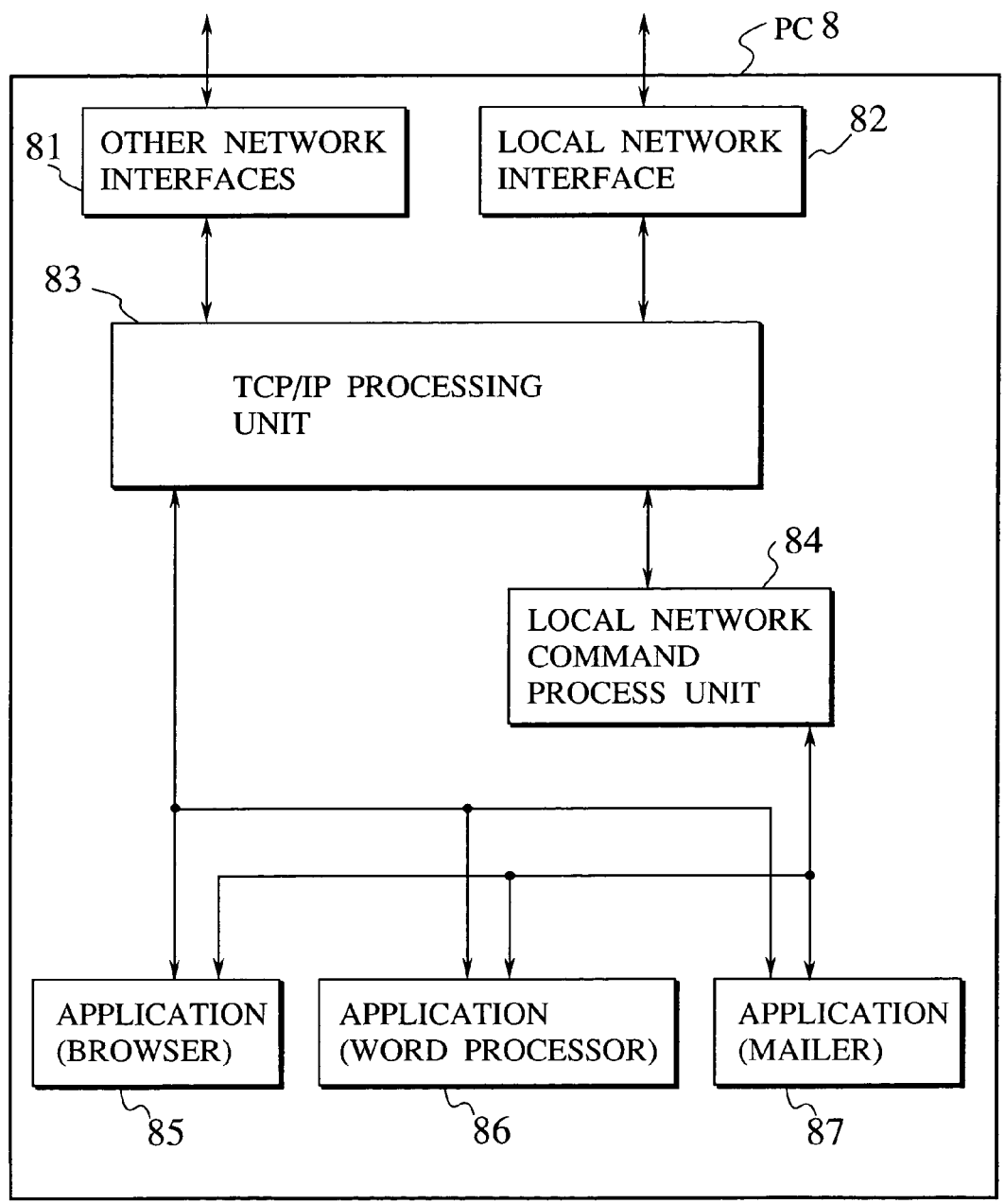

COMMUNICATION SCHEME FOR REALIZING EFFECTIVE DATA INPUT/SETUP IN COMPACT SIZE PORTABLE TERMINAL DEVICE USING LOCALLY CONNECTED NEARBY COMPUTER DEVICE

BACKGROUND OF THE INVENTION

1. Field of the Invention

The present invention relates to a communication scheme using a portable terminal device and a computer device having application program execution functions, and more particularly, to a communication scheme using a portable terminal device which is capable of carrying out data communications by being connected to a first computer network via a wireless telephone network, a radio base station or a gateway server while carrying out data communications by being connected to a second computer network formed with a nearby computer device, and a computer device that communicates with the portable terminal device through the second computer network.

2. Description of the Background Art

Due to the spread of portable telephones (cellular telephones) and PCS (Personal Communication System) terminals, communication services utilizing radio communication systems are widely in use recently. Using these portable telephones (cellular telephones) and PHS terminals, communication services are provided by carrying out radio communications with radio base stations and being multiply connected to wired communication networks through these base stations.

On the other hand, due to the spreading use of the worldwide computer network called "Internet", various information services on the Internet have been developed recently.

In particular, the Internet telephone (IP telephone) in which IP (Internet Protocol) packets are formed from telephone voice (speech) data and communications are carried out through the Internet by taking an advantage of the fact that a communication cost is extremely low on the Internet compared with the conventional telephone network has been a focus of much attention. Typically, as shown in FIG. 23, Internet telephone gateways 206 for relaying between a voice telephone network 3 and the Internet 4 are provided inside telephone stations, for example, and communications between these gateways 206 are carried out via the Internet 4 such that even long distance calls can be realized by incurring only a fee required for connection to a nearest telephone station (or a nearest location of the Internet telephone gateway).

Also, it is easily expanded into a scheme in which cellular telephones or PHS terminals are operated as terminal nodes for IP communications, i.e., wireless portable Internet terminals. For instance, as shown in FIG. 24, it is possible to realize an IP communication system in which a router device 205 for managing a plurality of radio base stations 202 is provided and data exchanges with the Internet 4 are carried out as this router device 205 functions as a gateway to the Internet 4.

By constructing communication systems as described above, it becomes possible to transfer multimedia data in various formats including voice telephone. In particular, in the Internet, it is possible to transfer voices, still images, video images, data files of a specific application, etc., by forming IP packets according to the standardized protocol called TCP/IP (Transmission Control Protocol/Internet Protocol), and it is also possible to operate existing Internet applications (such as Web browser) on a wireless portable terminal.

Now, in the case of using various applications on a wireless portable terminal in such an environment, because the wireless portable terminal generally has a compact or very compact body size, there arises a problem stemming from the compact or very compact body size that a data input interface for setting up application configuration data or entering input data (such as URL (Uniform Resource Locator) of a web site) has poor characteristic regarding its convenience in use and handling. Obviously, it is impossible to support a keyboard and a pointing device (such as mouse) similar to those of the ordinary PC. In order to rectify such a drawback, in the case of a portable telephone, for example, a measure for enabling a single hand operation of a compact terminal without requiring key operations has been provided by supporting a special user interface such as jog dial.

As described, in the case of utilizing applications such as Internet telephone, Web browser, email, etc., or other applications such as word processor in order to receive Internet services that handle Internet telephone, multimedia data, etc., by using a wireless portable terminal, when a wireless portable telephone that is generally in a compact size is used as a terminal, it has been very difficult to carry out the input/setup operations for data input/setup of Internet home page address (URL) data or various setup information, optional setup information of a word processor, etc., because of the poor handling of the input interface such as keyboard. Also, as such a terminal is to be utilized while moving, there are cases where it is necessary to update information such as network parameters at a visited site, but it has also been very difficult to carry out operations related to this because of the poor handling caused by the inability to freely use keyboard or mouse.

In addition, there are cases where applications to be operated on a wireless portable terminal are required to make special parameter setups because of limitations on resources such as size and resolution of a display that are imposed by the wireless portable terminal, unlike the standard applications on a portable note PC or a desk top PC. For this reason, when a user who normally uses the standard applications on the ordinary PC is going to shift to applications for the wireless portable terminal, even though it is desirable to make setups as close to those in the usual utilization environment as possible, there have been cases where it is impossible to shift between platforms smoothly by copying the setup information directly.

SUMMARY OF THE INVENTION

It is therefore an object of the present invention to provide a communication scheme for enabling improvement of handling of a user interface or omission of tedious operations in a portable terminal device which has a function for connecting to a prescribed computer network and a function for executing application programs (especially those that are to be used by being connected to the prescribed computer network) but which is also associated with a poor handling of a user interface because of its compact or very compact body size.

It is another object of the present invention to provide a communication scheme for a computer device that supports a portable terminal device in order to enable improvement of handling of a user interface or omission of tedious operations in the portable terminal device which has a function for executing application programs but which is also associated with a poor handling of a user interface because of its compact or very compact body size.

According to one aspect of the present invention there is provided a portable terminal device, comprising: a network connection unit configured to establish a connection to a computer network; a local network connection unit configured to establish a connection to a local network different from the computer network, the local network being a network locally defined among the portable terminal device and at least one other computer device; and a processing unit configured to obtain a prescribed information regarding the computer network that is necessary or utilizable in operating an application program to be operated on the portable terminal device by being connected to the computer network, from said at least one other computer device connected to the portable terminal device via the local network through the local network connection unit, carry out a prescribed processing for the application program according to at least a part of the prescribed information, and execute the application program by using a result of the prescribed processing and being connected to the computer network through the network connection unit.

According to another aspect of the present invention there is provided a computer device, comprising: a local network connection unit configured to establish a connection to a local network that is locally defined among the computer device and a portable terminal device; and a processing unit configured to return a reply containing an identification information for identifying a specified type of application program that exists in the computer device, or a prescribed information related to said specified type of application program, in response to a request received from the portable terminal device via the local network through the local network connection unit.

According to another aspect of the present invention there is provided a communication method of a portable terminal device having a function for executing application programs and a function for establishing a connection to a computer network; establishing a connection to a local network different from the computer network, the local network being a network locally defined among the portable terminal device and at least one other computer device; and obtaining a prescribed information regarding the computer network that is necessary or utilizable in operating an application program to be operated on the portable terminal device by being connected to the computer network, from said at least one other computer device connected to the portable terminal device via the local network, and carrying out a prescribed processing for the application program according to at least a part of the prescribed information.

According to another aspect of the present invention there is provided a communication method of a computer device, comprising: establishing a connection to a local network that is locally defined among the computer device and a portable terminal device; and returning a reply containing an identification information for identifying a specified type of application program that exists in the computer device, or a prescribed information related to said specified type of application program, in response to a request received from the portable terminal device via the local network.

According to another aspect of the present invention there is provided a computer usable medium having computer readable program codes embodied therein for causing a computer to function as a portable terminal device, the computer readable program codes include: a first computer readable program code for causing said computer to establish a connection to a computer network; a second computer readable program code for causing said computer to establish a connection to a local network different from the computer network, the local network being a network locally defined among the portable terminal device and at least one other computer device; and a third computer readable program code for causing said computer to obtain a prescribed information regarding the computer network that is necessary or utilizable in operating an application program to be operated on the portable terminal device by being connected to the computer network, from said at least one other computer device connected to the portable terminal device via the local network, carry out a prescribed processing for the application program according to at least a part of the prescribed information, and execute the application program by using a result of the prescribed processing and being connected to the computer network.

According to another aspect of the present invention there is provided a computer usable medium having computer readable program codes embodied therein for causing a computer to function as a computer device, the computer readable program codes include: a first computer readable program code for causing said computer to establish a connection to a local network that is locally defined among the computer device and a portable terminal device; and a second computer readable program code for causing said computer to return a reply containing an identification information for identifying a specified type of application program that exists in the computer device, or a prescribed information related to said specified type of application program, in response to a request received from the portable terminal device via the local network.

Other features and advantages of the present invention will become apparent from the following description taken in conjunction with the accompanying drawings.

BRIEF DESCRIPTION OF THE DRAWINGS

FIGS. 6A and 6B are diagrams showing general formats and exemplary command field values of a query command and a reply command that can be used in one embodiment of the present invention.

FIG. 25 is a block diagram showing an exemplary internal configuration of a personal computer in the network system of FIG. 1.

DETAILED DESCRIPTION OF THE PREFERRED EMBODIMENTS

Referring now to FIG. 1 to FIG. 22, one embodiment of the communication scheme according to the present invention will be described in detail.

First, with reference to FIG. 22, the basic configuration of this embodiment will be described.

Figure 22:
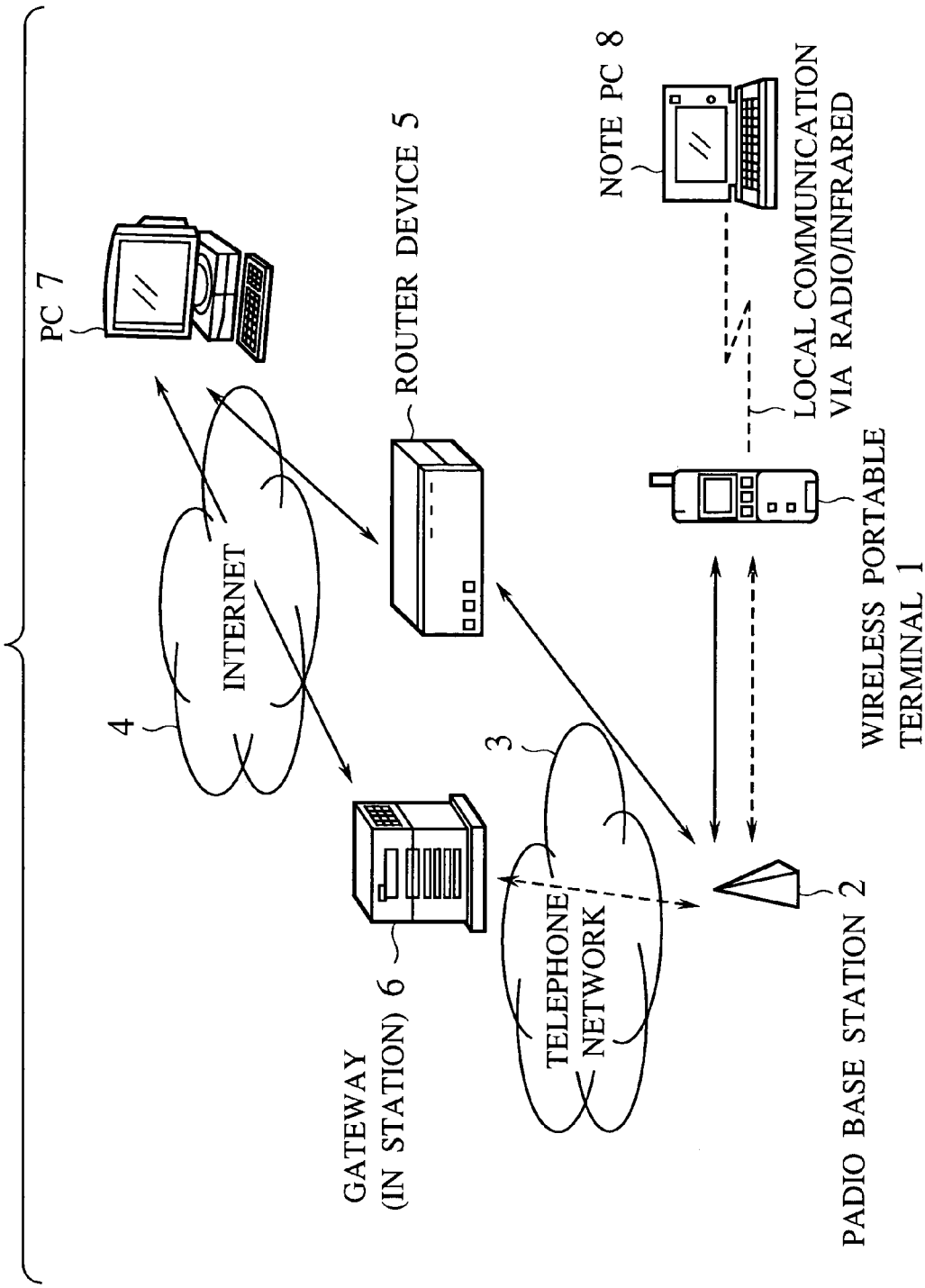
FIG. 22 is a schematic diagram for explaining a cooperation of the portable terminal device and another computer device according to one embodiment of the present invention.
Figure 23:
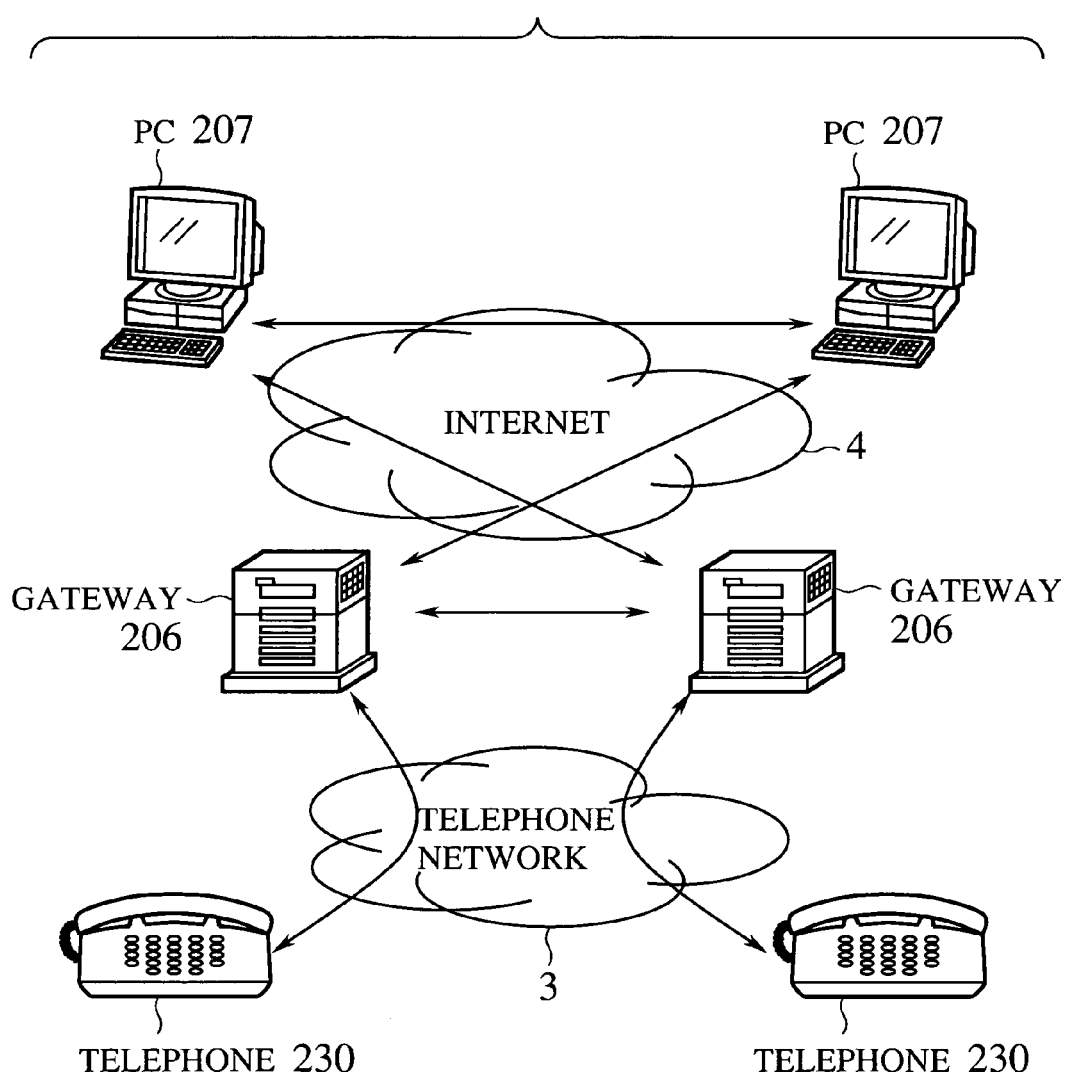
FIG. 23 is a schematic diagram for explaining a conventional Internet telephone network.
Figure 24:
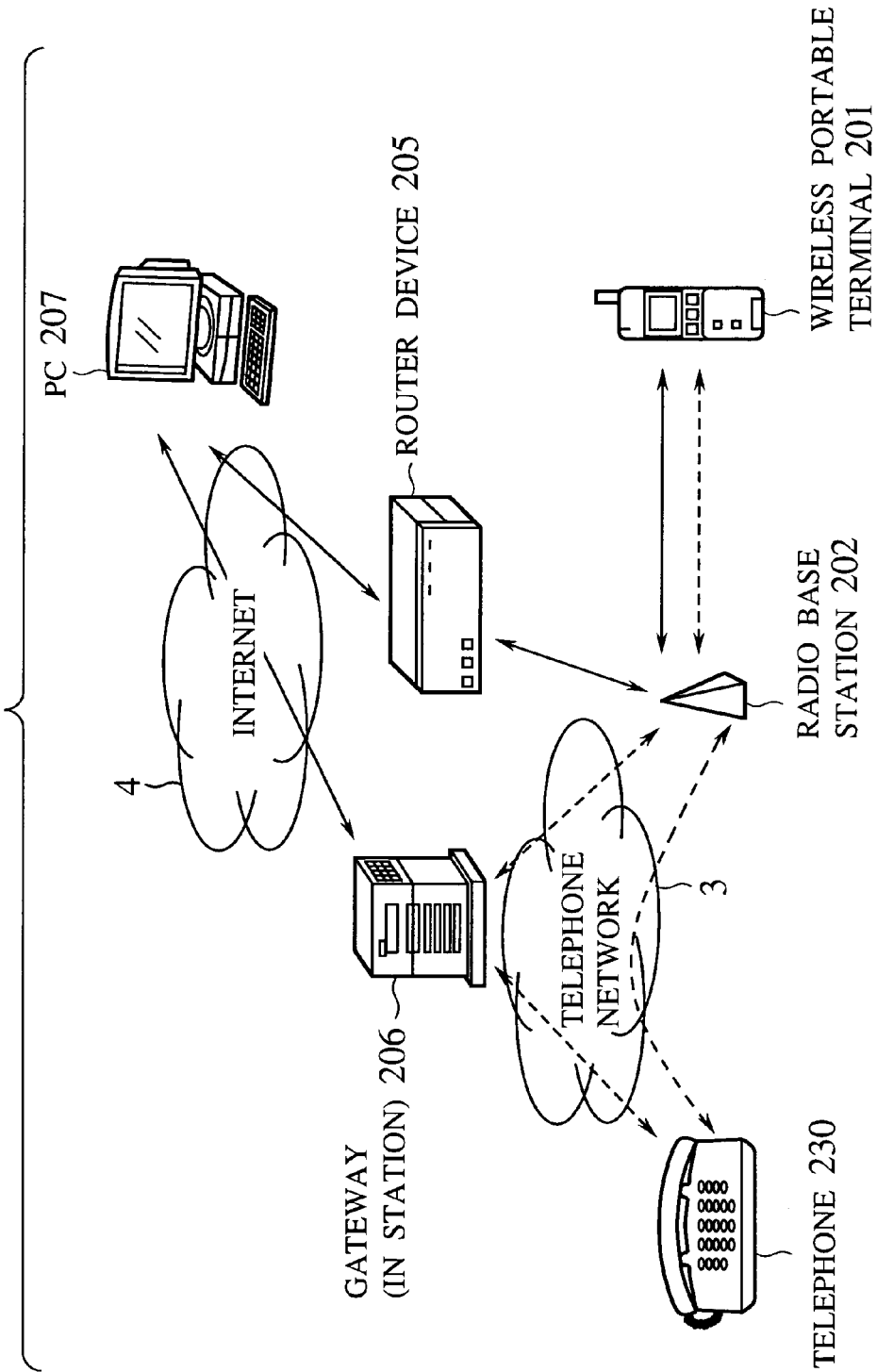
FIG. 24 is a schematic diagram for explaining a conventional Internet wireless telephone network.

FIG. 22 shows an exemplary network configuration assumed in this embodiment, and a manner of utilization of a wireless portable terminal according to this embodiment. In this configuration of FIG. 22, the case where a wireless portable terminal 1 carries out some communications with a correspondent (not shown) will be considered.

The wireless portable terminal 1 has a function for carrying out communications and other processing independently, but in this embodiment, the wireless portable terminal 1 also has a function for supporting a user interface by utilizing another computer. Another computer to be utilized can be a note PC (or may be a laptop PC or a desktop PC) carried around by a user who is carrying around the wireless portable terminal 1 as well, or a note PC, a laptop PC or a desktop PC that is located at a home, an office, or a public location at a visited site. The wireless portable terminal and PC are capable of carrying out local communications using a medium such as wireless LAN (Local Area Network), point-to-point wireless device (such as Bluetooth), or infrared (IrDA), for example. In addition, it is also possible to carry out IP communications.

This wireless portable terminal 1 exchanges various application setup information with a nearby PC through a local communication network in order to realize setup or configuration of applications operating on the own device, so as to enable smooth operations. Here, however, the exchanged data are further processed in order to account for a difference in a setup information format between applications operating on an ordinary PC and applications operating on the wireless portable terminal or to match a special user interface of the wireless portable terminal. For example, a prescribed processing for setup or configuration is carried out by using information obtained by carrying out a prescribed procedure with the nearby PC as follows.

(1) A mutual authentication is carried out with the cooperating PC.

(2) A type of application to be used is notified to the cooperating PC.

(3) A set of data necessary in activating the application such as standard application setup data, address list, etc., on the cooperating PC for the notified application type, that are transmitted from the cooperating PC, are received.

(4) The received application activation information such as setup data and address list is converted into a format that matches with the own setup scheme or interface, and a control for automatic setup is carried out.

In this way, the handling of the wireless portable terminal can be supplemented. In particular, it becomes possible to provide an improved handling by taking full advantage of the input/output device unique to the wireless portable terminal.

In the following, this embodiment will be described in further detail.

Figure 1:
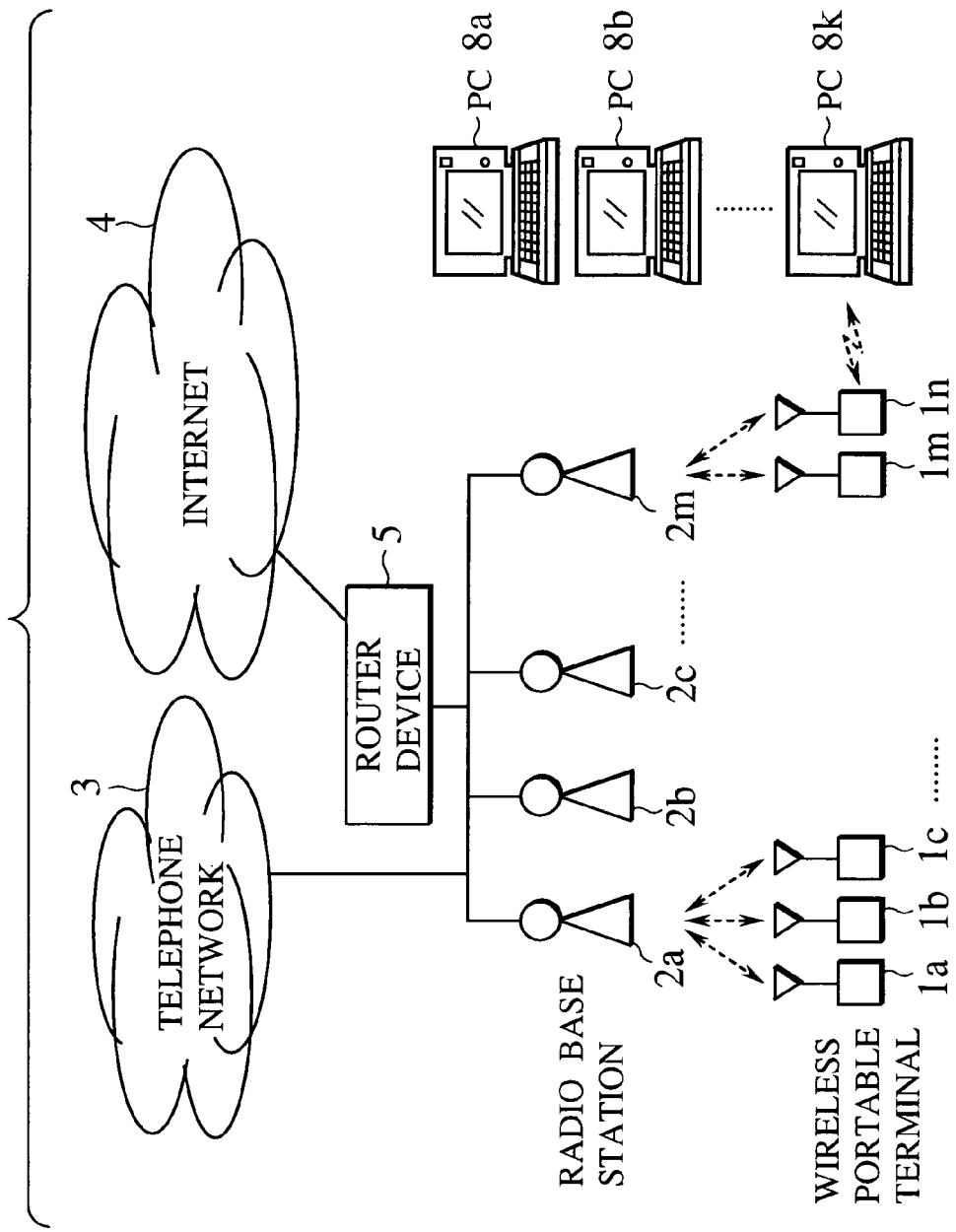
FIG. 1 is a schematic diagram showing an exemplary basic configuration of a network system according to one embodiment of the present invention.

FIG. 1 shows an exemplary basic configuration of a network according to this embodiment.

A wireless network, which is generally operated by a radio communication service provider or the like, accommodates wireless portable terminals 1 (1a to 1n in FIG. 1) using radio base stations 2 (2a to 2m in FIG. 1), and provides a service of communications among the wireless portable terminals 1 as well as a service of communications between the wireless portable terminal 1 and a telephone (not shown) accommodated in a telephone network 3. In addition, a router device 5 is provided, and a service of packet transfer from a wireless portable terminal 1 to an IP network such as Internet 4 and packet transfer from the IP network such as Internet 4 to the wireless portable terminal is provided by this router device 5 for packets containing voice data and other multimedia data that are transmitted from the wireless portable terminal 1.

On the other hand, the telephone network 3, which is generally operated by a communication service provider or the like, accommodates telephones (not shown), and provides a service of communications between a telephone and the wireless portable terminal 1. There are also cases where an Internet telephone gateway (not shown) is provided in the telephone network 3, in which cases the Internet telephone service for transferring voice telephone data via the IP network is provided by the Internet telephone gateway.

It is assumed that a user is carrying around the wireless portable terminal 1 and one or a plurality of note PCs (8*a* to 8*k* of FIG. 1) which can cooperate with the wireless portable terminal 1. There are also cases where one or a plurality of PCs that can cooperate with the wireless portable terminal 1 are provided at a visited site. Of course, it is also possible to utilize the PC at the visited site instead of having any node PC carried around by the user. There is no difference between the PC carried around by the user and the PC at the visited site in terms of their operations. There is however a difference in that the PC carried around by the user is customized to that user whereas the PC at the visited site is customized to that visited site.

Note that communications through the telephone network 3 are basically the same as the usual communications using a wireless portable telephone.

Next, a configuration of the wireless portable terminal according to this embodiment will be described.

Figure 2:
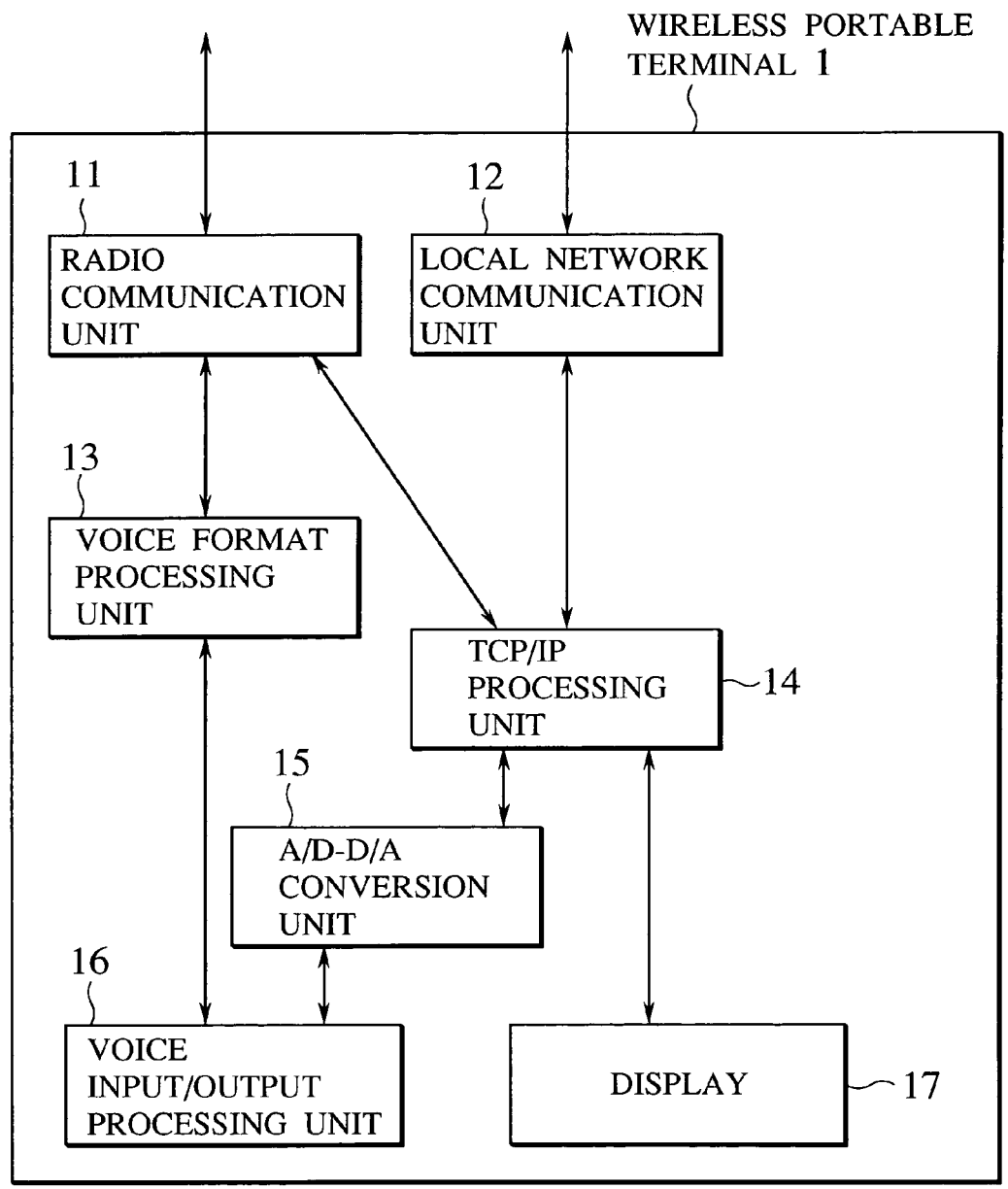
FIG. 2 is a block diagram showing an exemplary internal configuration of a wireless portable terminal in the network system of FIG. 1.

FIG. 2 shows an exemplary internal configuration of a wireless portable terminal according to this embodiment.

This wireless portable terminal has a radio communication unit 11, a local network communication unit 12, a voice format processing unit 13, a TCP/IP processing unit 14, an A/D-D/A conversion unit 15, a voice input/output processing unit 16, a display 17 as well as other input/output device, memory, etc. that are not shown in FIG. 2. This wireless portable terminal also has functions of usual wireless telephone or computer according to the need.

The radio communication unit 11 is an input/output unit for carrying out communications with the wireless telephone network through one of the radio base stations 2*a* to 2*m* (that is selected according to the signal power, for example), similarly as in the usual wireless telephone. On the other hand, the local network communication unit 12 is an interface for carrying out communications with the PCs 8*a* to 8*k* that are carried around by the user along with this wireless portable terminal 1, using radio or infrared (such as IrDA).

The voice format processing unit 13 carries out a processing of voice telephone data. The voice telephone data received from the wireless telephone network are processed here and then sent to a voice input/output processing unit 16.

On the other hand, voice packet data directly received from the Internet 4 are received at the TCP/IP processing unit 14, converted into analog data at the A/D-D/A conversion unit 15, and then sent to the voice input/output processing unit 16. Also, data other than voice data such as image data, for example, that are received from the Internet 4, are processed by appropriate dedicated application at the TCP/IP processing unit 14, and outputted to the display 17 according to the need.

The display 17 is one associated with the body of the wireless portable terminal device, which has inferior output size and resolution compared with the other desktop PC or node PC.

Note that, as already mentioned above, the user is assumed to be carrying around one or a plurality of PCs 8*a* to 8*k* along with the wireless portable terminal 1 in this embodiment. Here, a problem regarding security may arise if communications are carried out unconditionally whenever they are connected by the wireless/infrared network. For this reason, it is preferable for the wireless portable terminal 1 and the PC 8 to carry out communications after carrying out the mutual authentication according to a cryptographic scheme and establishing an authenticated communication path, before mutually exchanging data through the local network using wireless LAN, point-to-point wireless device or infrared.

This can be realized, for example, by a scheme in which A encrypts its own ID by using own secret key and transmits this encrypted ID to B and B that received the encrypted ID decrypts the encrypted ID by using a public key of A, then B encrypts the decrypted ID by using own secret key and transmits the re-encrypted ID to A and A that received the re-encrypted ID decrypts the re-encrypted ID by using a public key of A to check if the re-decrypted ID is same as the original ID. In the case of carrying out communications with a plurality of PCs through the local network, the similar authentication process is carried out with respect to each PC and as many authenticated communication paths as the number of PCs are generated, and then the necessary data exchanges are carried out. This procedure is also applied in the case where the wireless portable terminal cooperates with the PC at the visited site.

In the following, several concrete examples of a manner by which the wireless portable terminal 1 utilizes the nearby PC will be described.

Now, in the communications via the IP network, various application programs (abbreviated hereafter as applications) that have been developed conventionally for Internet or Intranet can be operated on the wireless portable terminal 1. For example, a Web browser or a file transfer program can be used as they are. However, the wireless portable terminal 1 is generally in a compact size, so that sufficient resources cannot be allocated to the input/output device (such as mouse, keyboard, and display, for example) for carrying out input/output of parameters or data, and for this reason there are cases where a difficulty is encountered in carrying out input/setup of information that is to be carried out by using a keyboard or mouse in the applications for the usual PCs.

In this embodiment, such a setup of information whose input is difficult at the wireless portable terminal 1 is compensated by data communications with the nearby PC or group of PCs.

Figure 3:
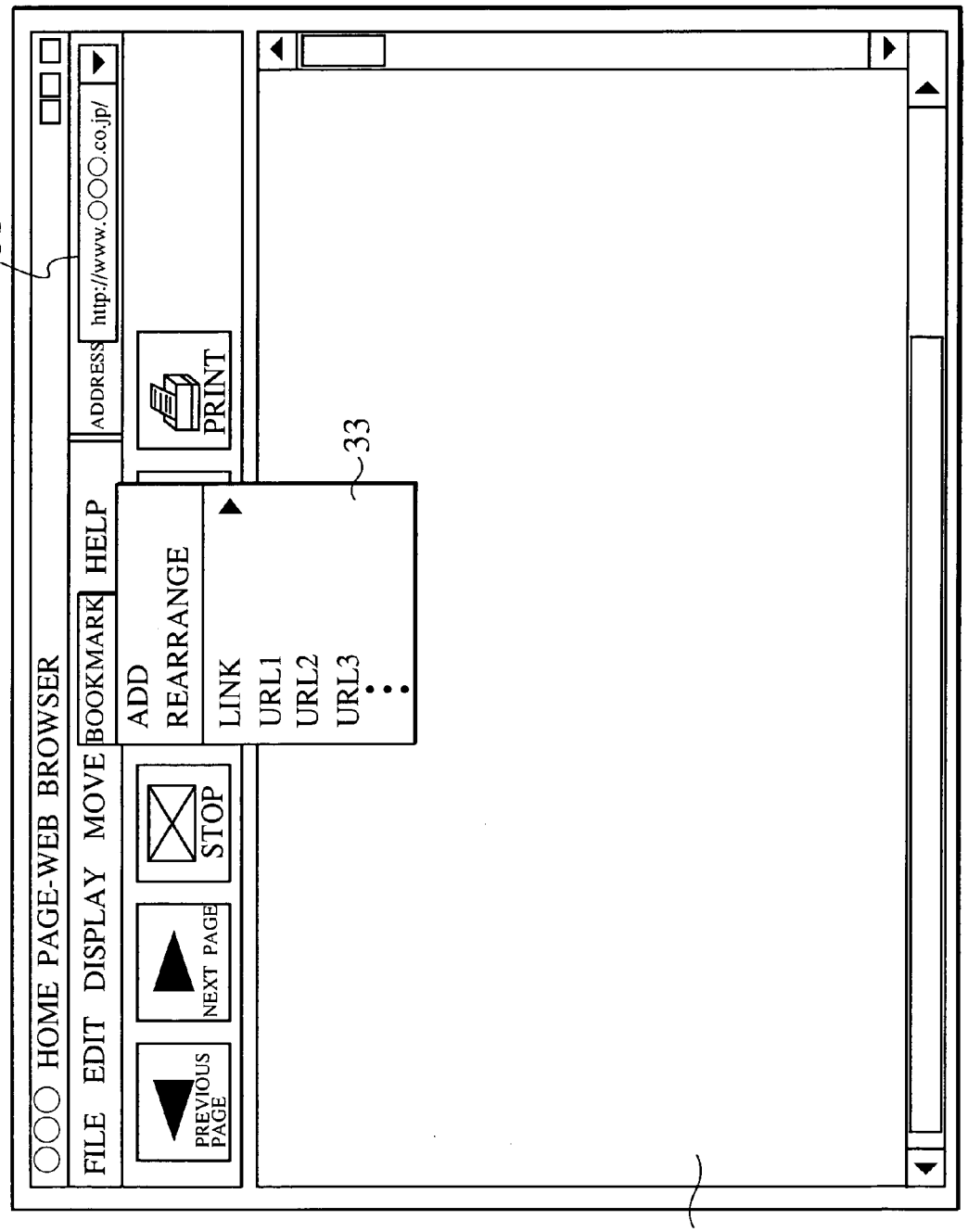
FIG. 3 is a diagram showing an exemplary display of a typical Web browser that can be used in the network system of FIG. 1.

First, an exemplary case of input/setup of a URL to be utilized by the Web browser from the PC 8 will be described. FIG. 3 shows an exemplary display of a typical Web browser.

In the Web browser, when a WWW address is specified in a URL field 31, a request message in the http protocol is issued to the Internet, and a page information obtained in response is displayed at a page display region 32. In order to make an input of this URL address, a means for inputting alphanumeric symbols is necessary, but the wireless portable terminal 1 in a compact size has a poor handling regarding this input operation. On the other hand, there is a data called bookmark which holds a list of URLs that are frequently accessed. In the standard Web browser, an interface 33 for this bookmark data is also one in which each URL is to be selected from a menu using a mouse.

In the wireless portable terminal 1 having a constraint on the handling of the input/output device, it is possible to receive this bookmark data from the nearby PC 8 and store it into a memory in a format matching with the interface unique to a compact terminal for the sake of later use.

Figure 4:
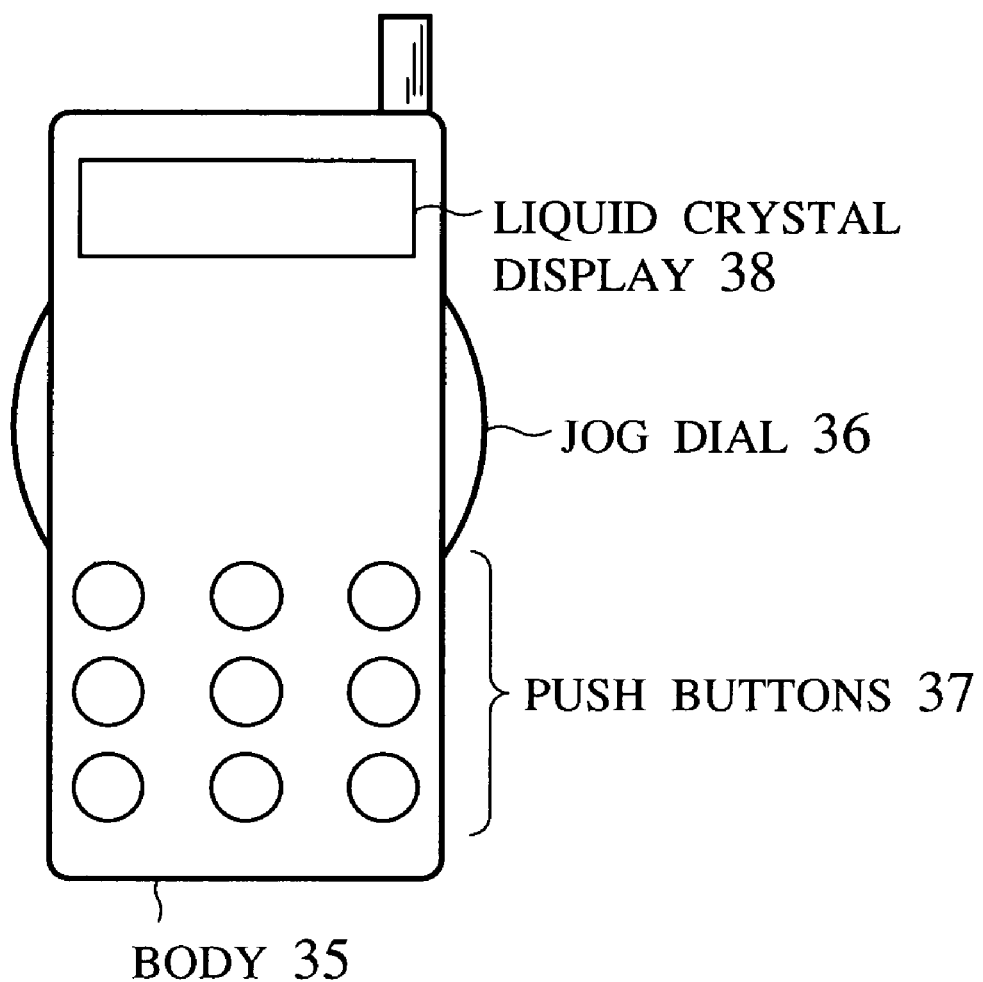
FIG. 4 is a diagram showing an exemplary input interface that can be provided on the portable terminal device of FIG. 2.

For example, consider a wireless portable terminal with a body 35 that provides an operation environment as shown in FIG. 4. In FIG. 4, using a combination of a jog dial 36 and push buttons 37, it is possible to make the following operations: (1) a selection of a URL selection mode by using push buttons 37; (2) a display of the bookmark data received from the nearby PC at a liquid crystal display 38 using the jog dial 36 (in which the URL is switched one by one whenever the jog dial 36 is rotated slightly, for example); and (3) a URL selection from the bookmark by using the push buttons 37 again.

Figure 5:
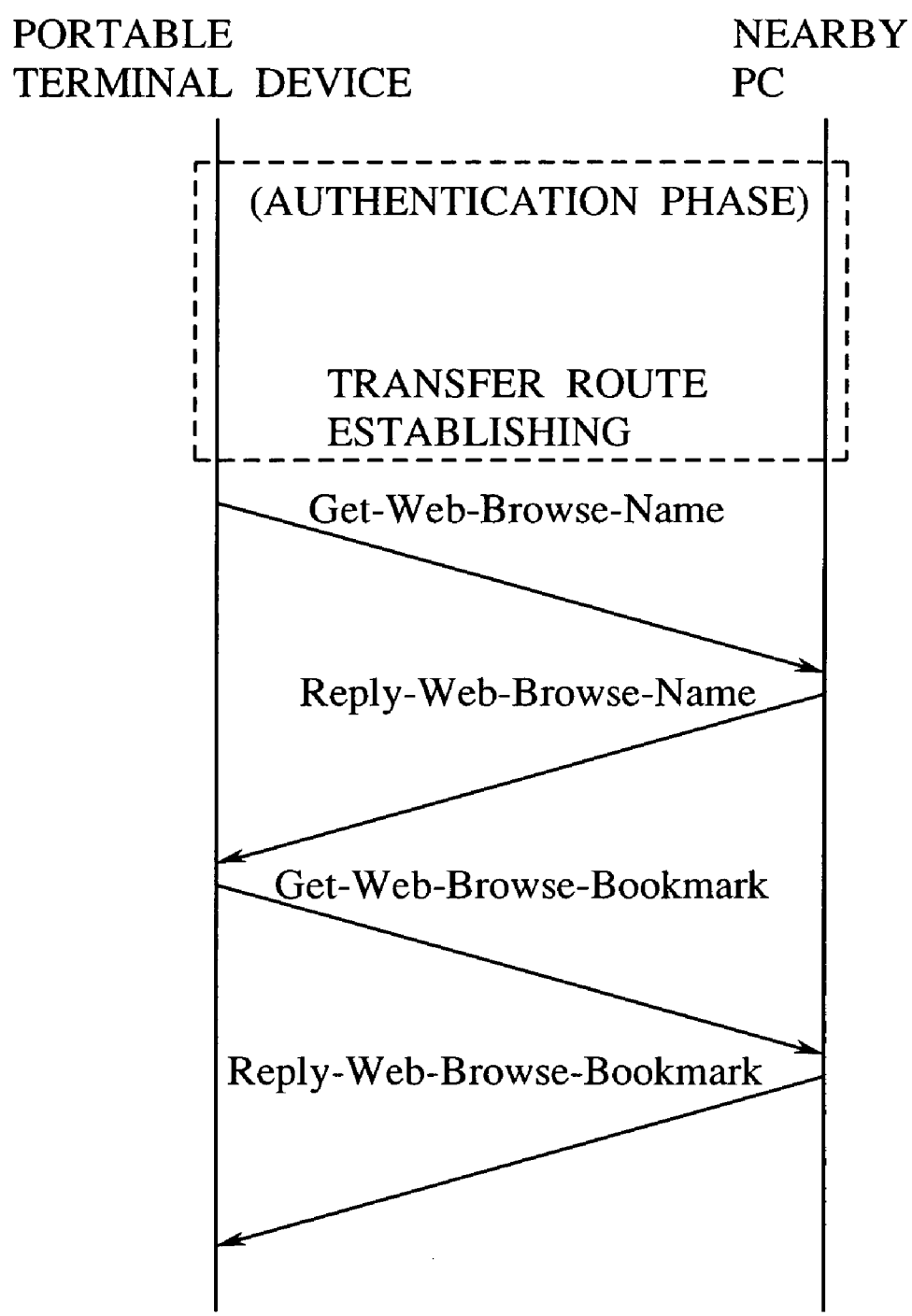
FIG. 5 is a sequence chart showing an exemplary message exchange sequence for obtaining bookmark data according to one embodiment of the present invention.

Here, it is necessary for the wireless portable terminal 1 side to judge a type of the Web browser that operates on the nearby PC 8 in communication and convert the bookmark data into a prescribed format on the wireless portable terminal 1 side according to the judged type. FIG. 5 shows an exemplary message exchange sequence for this purpose.

First, a prescribed authentication procedure is carried out between the wireless portable terminal 1 and the nearby PC 8.

Next, when the authentication procedure succeeded, the wireless portable terminal 1 obtains a program type of the Web browser on the nearby PC 8. To this end, the wireless portable terminal 1 transmits a Get-Web-Browser-Name command, for example. Each command type will be described in detail later.

In response, the nearby PC 8 returns a Reply-Web-Browser-Name command attached with a program name of a Web browser activated by the own device. For example, it is notified that a Web browser with a program name of 000 browser Ver. 3.0 is used.

The wireless portable terminal 1 that obtained the reply containing the Web browser name then transmits a Get-Web-Browser-Bookmark command.

In response, the nearby PC 8 returns a Reply-Web-Browser-Bookmark command attached with the Bookmark data in a prescribed format of that Web browser (000 browser Ver. 3.0, for example).

The wireless portable terminal 1 takes out the URL data attached to this Reply-Web-Browser-Bookmark command, converts it into a format usable in the own jog dial interface, and stores it into a prescribed memory. Namely, it becomes possible for the wireless portable terminal 1 to upload and use the Bookmark data set up by the Web browser operating on the nearby PC 8.

This is convenient under a situation where the user is carrying around the usually used note PC along with the wireless portable terminal 1.

Note that, in the above procedure, the nearby PC 8 returns the Reply-Web-Browser-Name command containing an information indicating no Web browsers if the Web browser is not installed. Also, when the Reply-Web-Browser-Name command containing an information indicating no Web browsers is received, the procedure is finished (and if there is another nearby PC, the above procedure is carried out with respect to that PC, for example).

Here, the command message formats to be used between the wireless portable terminal 1 and the nearby PC 8 can be defined appropriately according to the required operations. Exemplary general formats of messages to be used in this embodiment are shown in FIGS. 6A and 6B, 7A and 7B, and 8A and 8B.

FIG. 6A shows a general format of a query command to be issued from the wireless portable terminal 1 side, and a list of command field values.

FIG. 6B shows a format of a reply command to be issued from the nearby PC 8 in response. An extension field is in a command dependent format which can be defined appropriately.

Figure 7A:
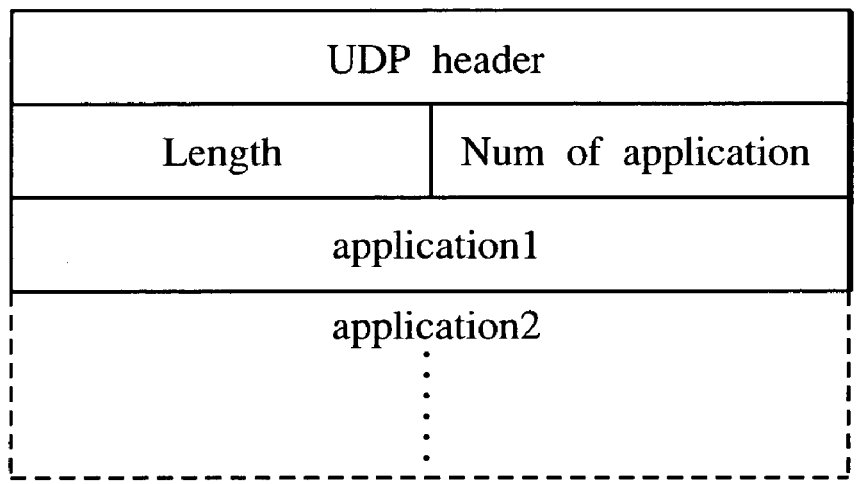
FIGS. 7A and 7B are diagrams showing general formats and exemplary command field values of an application list notification command and an application list reply command that can be used in one embodiment of the present invention.
Figure 7B:
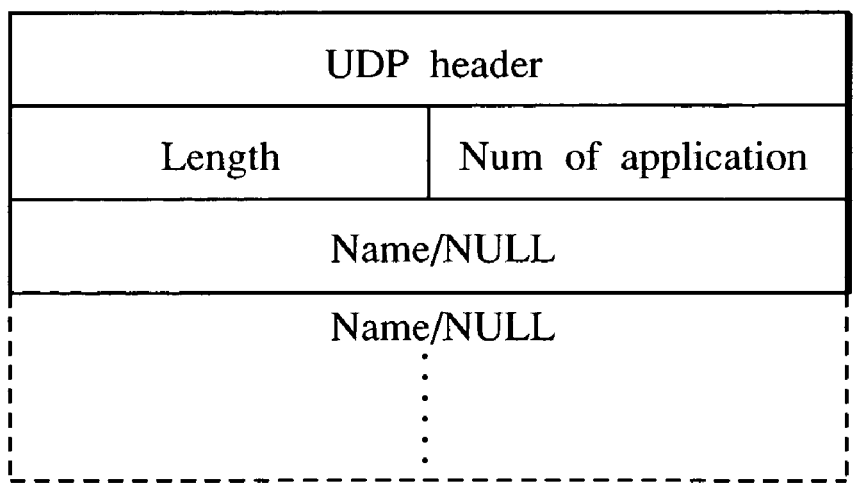

FIGS. 7A and 7B respectively show formats of an application list notification command (wireless portable terminal→nearby PC) and a corresponding application list reply command (nearby PC→wireless portable terminal) that are to be used at a time of the collective setup to be described below. The reply command returns NULL if no corresponding application is provided as will be described below.

Figure 8A:
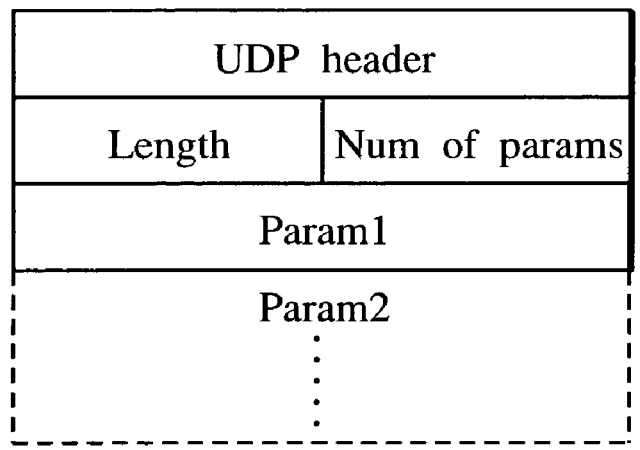
FIGS. 8A and 8B are diagrams showing general formats and exemplary command field values of a parameter list request command and a parameter list reply command that can be used in one embodiment of the present invention.
Figure 8B:
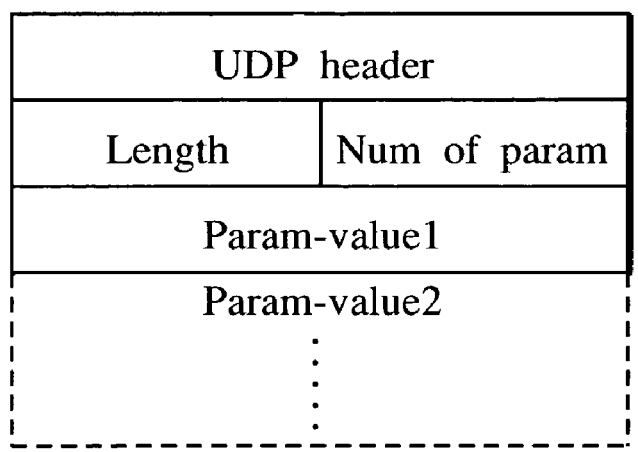

FIGS. 8A and 8B respectively show formats of a parameter list request command (wireless portable terminal→nearby PC) and a corresponding parameter list reply command (nearby PC→wireless portable terminal) that are to be exchanged subsequent to the application list notification command and the application list reply command of FIGS. 7A and 7B.

Figure 9:
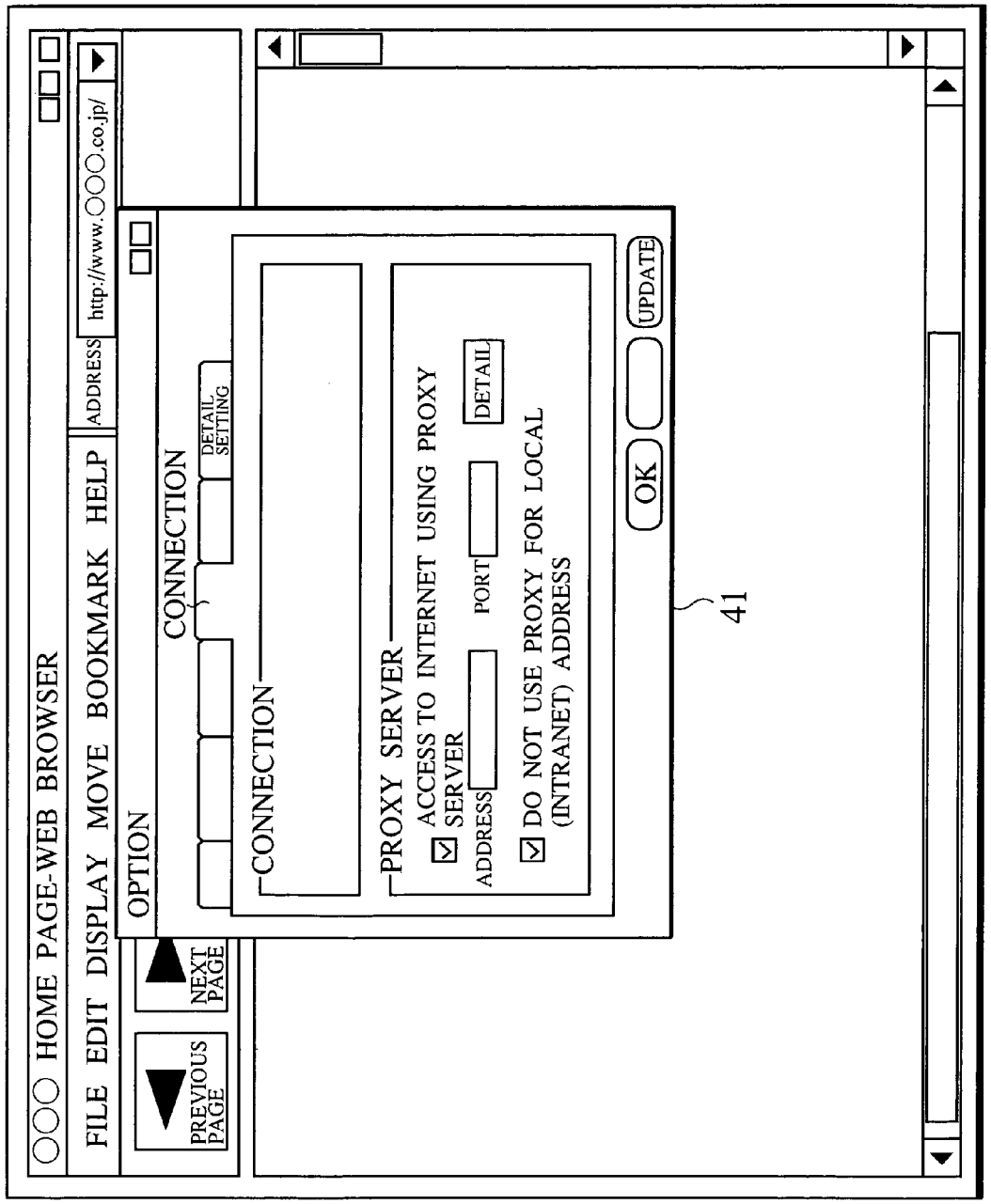
FIG. 9 is a diagram showing an exemplary display of an information setup for Internet connection in a typical Web browser that can be used in the network system of FIG. 1.

Next, an exemplary case of input/setup of operation parameters to be set up in the Web browser from the PC 8 will be described. FIG. 9 shows an exemplary information setup for the purpose of Internet connection in a typical Web browser.

In an option setup screen 41 of this example, operation parameters of the Web browser such as a DNS name of a Proxy server and URLs to which the connection via the Proxy server is to be made are set up. In order to make an input of these data, an input means is necessary but the wireless portable terminal 1 in a compact size has a poor handling regarding this setup operation.

Figure 10:
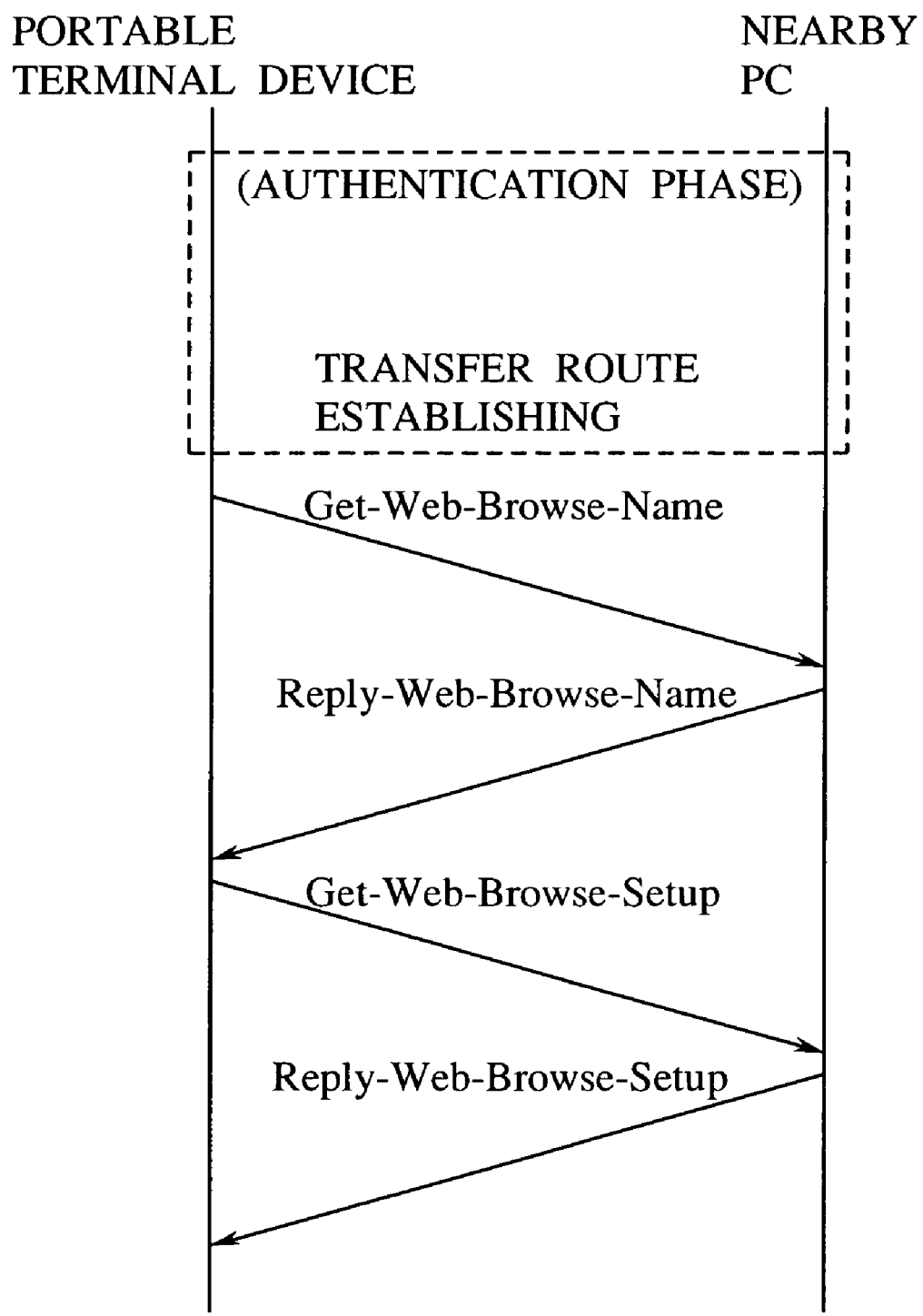
FIG. 10 is a sequence chart showing an exemplary message exchange sequence for obtaining Web browser setup data according to one embodiment of the present invention.

In this embodiment, it is possible to make the browser parameter setup by receiving these Web browser setup parameters from the nearby PC 8 and storing them in a format matching with the browser of a compact terminal. FIG. 10 shows an exemplary message exchange sequence for this purpose.

First, a prescribed authentication procedure is carried out between the wireless portable terminal 1 and the nearby PC 8.

Next, when the authentication procedure succeeded, the wireless portable terminal 1 transmits a Get-Web-Browser-Name command in order to obtain a program type of a Web browser on the nearby PC 8, and receives a Reply-Web-Browser-Name command attached with a program name of a Web browser activated on the nearby PC 8 from the nearby PC 8. For example, it is notified that a Web browser with a program name of 000 browser Ver. 3.0 is used.

The wireless portable terminal 1 that obtained this reply then transmits a Get-Web-Browser-Setup command.

In response, the nearby PC 8 returns a Reply-Web-Browser-Setup command attached with the browser setup data in a prescribed format of that Web browser (000 browser Ver. 3.0, for example).

The wireless portable terminal 1 takes out the setup parameters attached to this Reply-Web-Browser-Setup command, and stores them into an own browser setup data memory. Here, it is not necessary that all the data are to be set up in one-to-one correspondence, but it is preferable for the setup at the wireless portable terminal 1 to somehow reflect at least those parameters that are dependent on the network attributes at the current visited site. Namely, it becomes possible for the wireless portable terminal 1 to upload and use the setup data of the Web browser operating on the nearby PC 8.

This is convenient under a situation where it is desired to use the same setup data as the PC that is set up at a visited site network (a branch, for example) in the wireless portable terminal 1 at that network.

Note that, in the above procedure, the nearby PC 8 returns the Reply-Web-Browser-Name command containing an information indicating no Web browsers if the Web browser is not installed, similarly as in the previous example. Also, when the Reply-Web-Browser-Name command containing an information indicating no Web browsers is received, the procedure is finished (and if there is another nearby PC, the above procedure is carried out with respect to that PC, for example).

Note also that the above description is directed to the case of Internet applications, but the present invention is also applicable to general applications.

Figure 11:
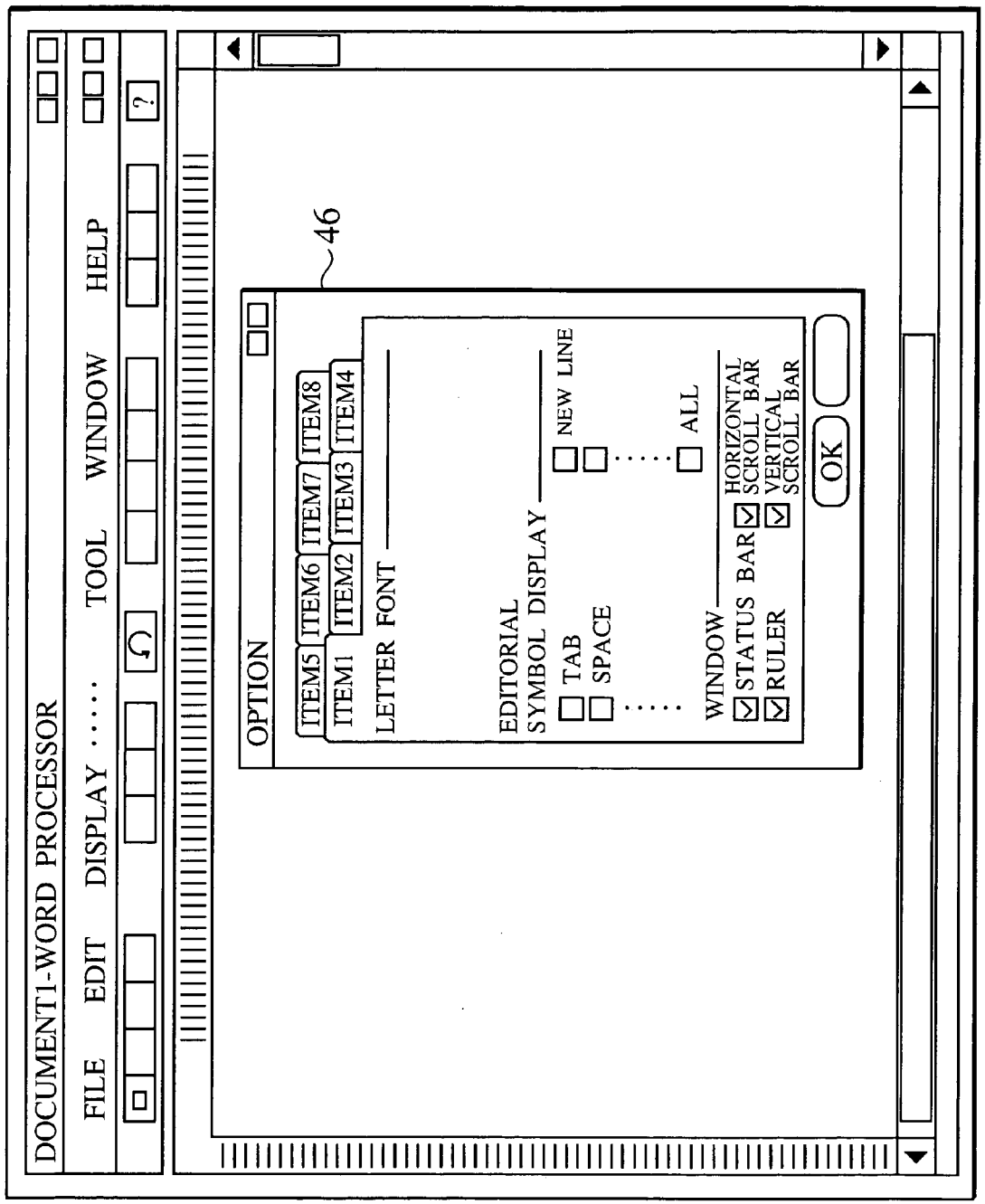
FIG. 11 is a diagram showing an exemplary display of an option setup for a word processor that can be used in the network system of FIG. 1.

Next, an exemplary case of input of option setup data to be set up in the word processor from the PC 8 will be described. FIG. 11 shows an exemplary option setup in a word processor used in the standard PC.

In an option setup screen 46 of this example, many option setups such as letter form, presence/absence of editorial symbol display, presence/absence of status bar or scroll bar display, etc., can be made. In order to make an input of these data, an input means is necessary but the wireless portable terminal 1 in a compact size has a poor handling regarding this setup operation.

In this embodiment, it is possible to make the word processor option parameter setup by receiving these word processor option set up parameters from the nearby PC 8 and storing them in a format matching with the word processor of a compact terminal. The message exchange sequence for this purpose is basically the same as that of FIG. 10.

First, a prescribed authentication procedure is carried out between the wireless portable terminal 1 and the nearby PC 8.

Next, when the authentication procedure succeeded, the wireless portable terminal 1 obtains a program type of a word processor on the nearby PC 8. To this end, the wireless portable terminal 1 transmits a Get-Word-Processor-Name command.

In response, the nearby PC 8 returns a Reply-Word-Processor-Name command attached with a program name of a word processor activated on the own device. For example, it is notified that a word processor with a program name of 000 word processor Ver. 8.0 is used.

The wireless portable terminal 1 that obtained this reply then transmits a Get-Word-Processor-option command.

In response, the nearby PC 8 returns a Reply-Word-Processor-option Processor-option command attached with the option data in a prescribed format of that word processor (000 word processor Ver. 8.0, for example).

The wireless portable terminal 1 takes out the option data attached to this Reply-Word-Processor-option command, and stores them into an own word processor setup data memory. Here, if items of the option data of the wireless portable terminal 1 and items of the option data of the nearby PC 8 are not in one-to-one correspondence, only corresponding ones may be reflected, or convertible ones may be reflected after the conversion.

In this way, it becomes possible to make the operation mode setup easily by entering the setup data unique to the application into the wireless portable terminal 1 side by uploading from the nearby PC 8.

This is convenient under a situation where the user is carrying around the usually used note PC along with the wireless portable terminal 1.

Note that, in the above procedure, the nearby PC 8 returns the Reply-Word-Processor-Name command containing an information indicating no word processors if the word processor is not installed, similarly as in the previous example. Also, when the Reply-Word-Processor-Name command containing an information indicating no word processors is received, the procedure is finished (and if there is another nearby PC, the above procedure is carried out with respect to that PC, for example).

Figure 12:
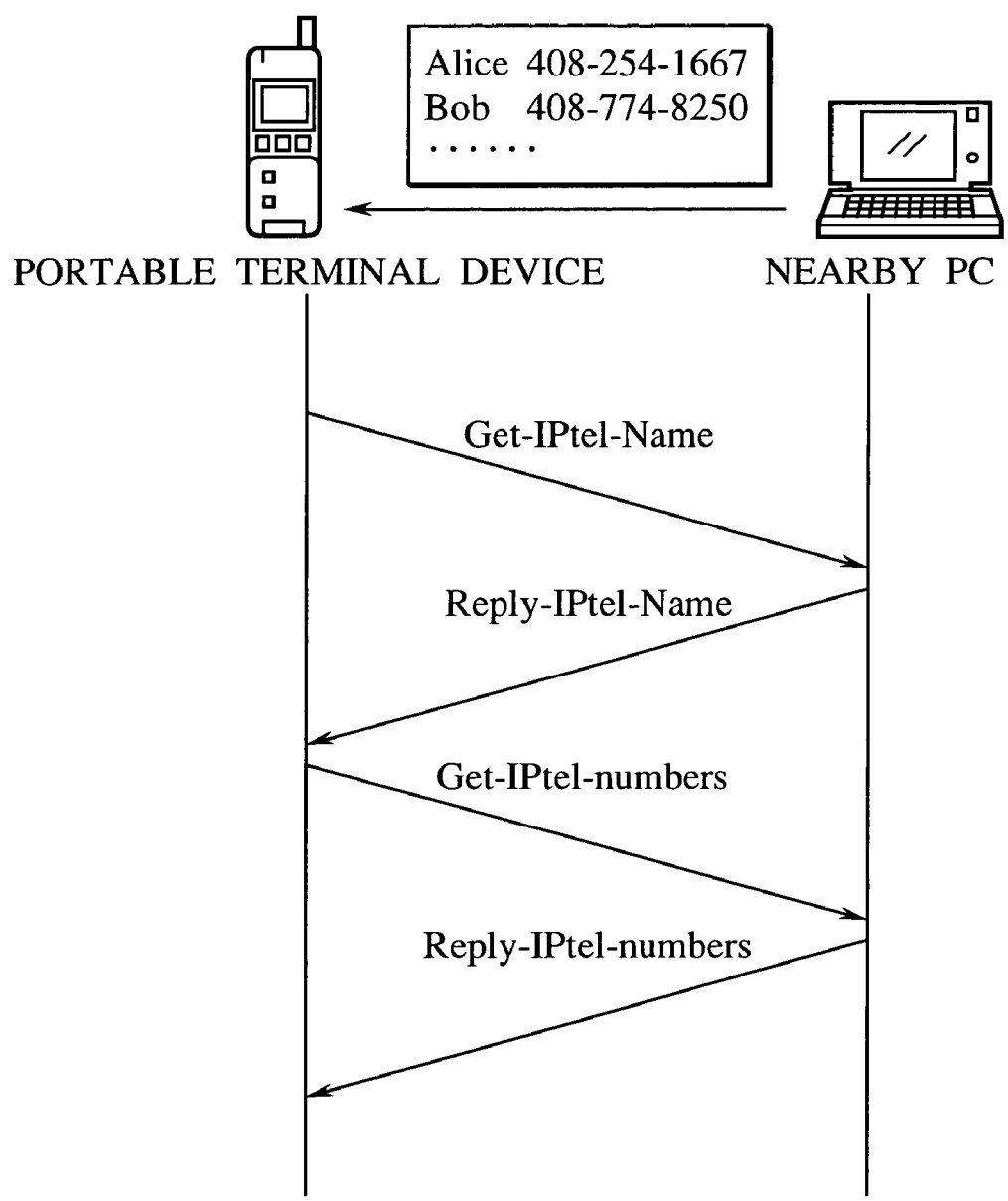
FIG. 12 is a sequence chart showing an exemplary message exchange sequence for obtaining Internet telephone numbers according to one embodiment of the present invention.

Next, an exemplary case of retrieval of a telephone number of an Internet telephone from telephone number data stored in the nearby PC 8 will be described. FIG. 12 shows an exemplary message exchange sequence in this case.

First, a prescribed authentication procedure is carried out between the wireless portable terminal 1 and the nearby PC 8.

Next, when the authentication procedure succeeded, the wireless portable terminal 1 obtains a program type of an Internet telephone on the nearby PC 8. To this end, the wireless portable terminal 1 transmits a Get-IPtel-Name command.

In response, the nearby PC 8 returns a Reply-IPtel-Name command attached with a program name of an Internet telephone activated on the own device.

The wireless portable terminal 1 that obtained this reply then transmits a Get-IPtel-numbers command.

In response, the nearby PC 8 returns a Reply-IPtel-numbers command attached with the telephone numbers of the Internet telephone.

The wireless portable terminal 1 takes out the telephone numbers of the Internet telephone attached to this Reply-IPtel-numbers command, and stores them into an own Internet telephone setup data memory.

In this way, it becomes possible to provide a comfortable utilization environment in which the limitations on the handling of the input/output device, and the local communication amount between the wireless portable terminal and the nearby PC are compensated.

Note that, in the above procedure, the nearby PC 8 returns the Reply-IPtel-Name command containing an information indicating no Internet telephones if the Internet telephone is not installed, similarly as in the previous example. Also, when the Reply-IPtel-Name command containing an information indicating no Internet telephones is received, the procedure is finished (and if there is another nearby PC, the above procedure is carried out with respect to that PC, for example).

Figure 13:
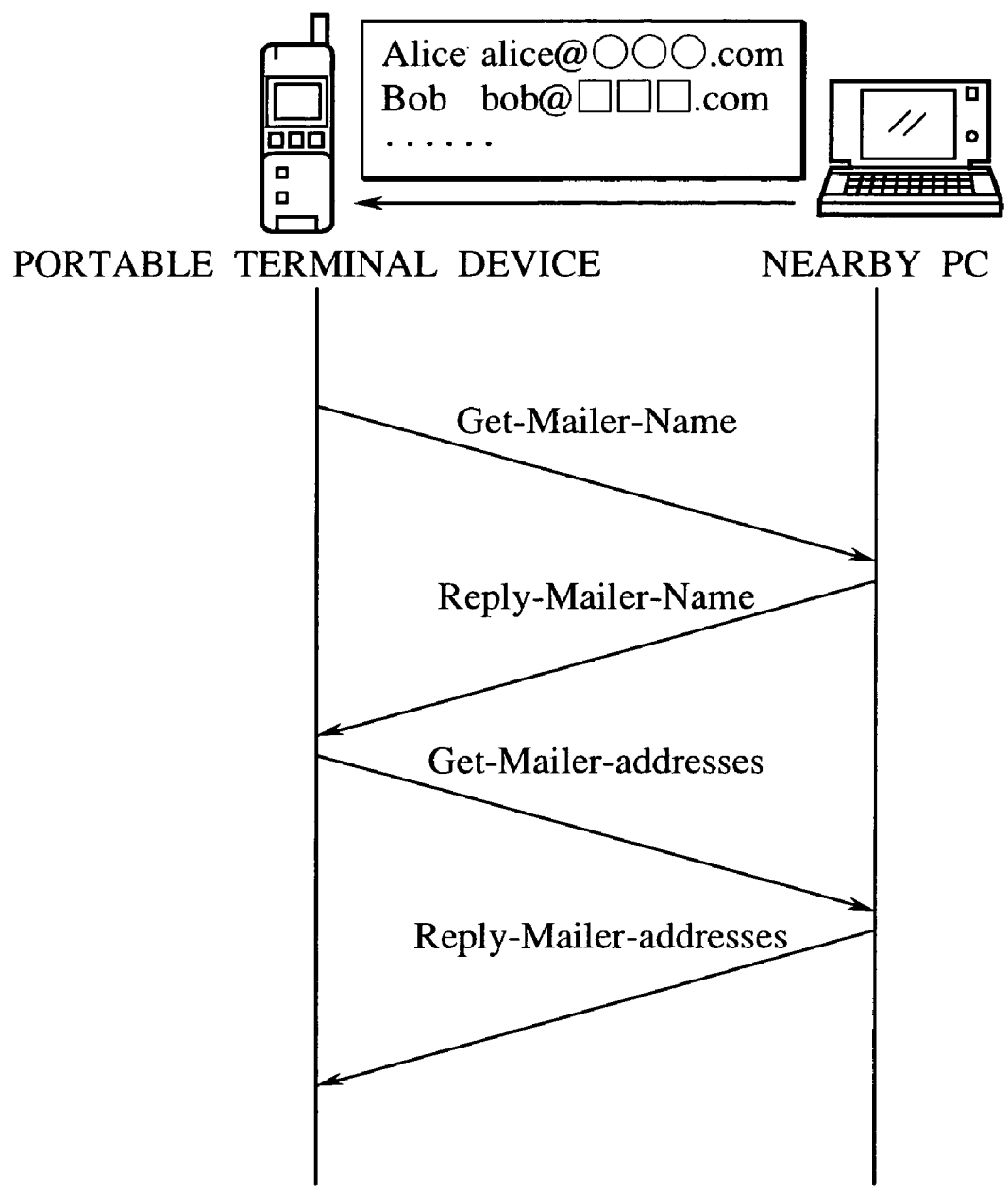
FIG. 13 is a sequence chart showing an exemplary message exchange sequence for obtaining email addresses according to one embodiment of the present invention.

Next, an exemplary case of retrieval of a mail address of an email handler from data stored in the nearby PC 8 will be described. FIG. 13 shows an exemplary message exchange sequence in this case.

First, a prescribed authentication procedure is carried out between the wireless portable terminal 1 and the nearby PC 8.

Next, when the authentication procedure succeeded, the wireless portable terminal 1 obtains a program type of an email handler on the nearby PC 8. To this end, the wireless portable terminal 1 transmits a Get-Mailer-Name command.

In response, the nearby PC 8 returns a Reply-Mailer-Name command attached with a program name of an email handler activated on the own device.

The wireless portable terminal 1 that obtained this reply then transmits a Get-Mailer-addresses command.

In response, the nearby PC 8 returns a Reply-Mailer-addresses command attached with the mail addresses of the email handler.

The wireless portable terminal 1 takes out the mail addresses of the email handler attached to this Reply-Mailer-addresses command, and stores them into an own email setup data memory.

In this way, it becomes possible to provide a comfortable utilization environment in which the limitations on the handling of the input/output device, and the local communication amount between the wireless portable terminal and the nearby PC are compensated.

Note that, in the above procedure, the nearby PC 8 returns the Reply-Mailer-Name command containing an information indicating no email handlers if the email handler is not installed, similarly as in the previous example. Also, when the Reply-Mailer-Name command containing an information indicating no email handlers is received, the procedure is finished (and if there is another nearby PC, the above procedure is carried out with respect to that PC, for example).

In each of the above procedures, when the Reply-*-Name command is received from the nearby PC 8, the wireless portable terminal 1 may Judge whether information regarding the application with a program name notified from the nearby PC 8** is utilizable on the own device or not and interrupt the subsequent procedure when it is not utilizable on the own device even if it is acquired.

Also, in each of the above procedures, the nearby PC 8 may notify a program name of a resembling application if the corresponding application does not exist but a resembling application exists. In this case, the wireless portable terminal 1 may judge whether information regarding the application with a program name notified from the nearby PC 8 is utilizable on the own device or not and interrupt the subsequent procedure when it is not utilizable on the own device even if it is acquired.

Also, in each of the above procedures, a specified application program name may be included in the Get-* command transmitted from the wireless portable terminal 1 to the nearby PC 8 and the nearby PC 8 may return a reply containing an information indicating whether an application corresponding to the specified application program name exists or not. Also, in this case, the nearby PC 8** may notify a program name of a resembling application if an application corresponding to the specified application program name does not exist but a resembling application exists, in addition to the information indicating whether an application corresponding to the specified application program name exists or not. The same remarks as above also apply thereafter.

Also, if the corresponding application does not exist but a resembling application exists, the nearby PC 8 may judge whether an information regarding that resembling application is utilizable at the request source wireless portable terminal 1 or not according to information registered in advance, and carry out the notification only when it is utilizable.

Besides these, many variations of the above procedures are possible.

Next, an exemplary case where the wireless portable terminal 1 has a plurality of applications which can utilize the nearby PC will be described.

In the case of automatically carrying out the setup or the like for two or more applications by utilizing the nearby PC, basically the following two methods are possible in terms of exchanges with PC.

(1) All (or a part of a plurality of) application data to be installed are obtained from the nearby PC at a timing where the wireless portable terminal is activated.

(2) Data regarding each individual application is obtained from the nearby PC at a timing where each individual application is activated after the activation of the wireless portable terminal.

In the following, the latter method will be described first.

The method for obtaining necessary data at a time of the application activation basically amounts to carrying out the message exchanges such as those shown in FIG. 5 or FIG. 10 individually for each application that is installed on the wireless portable terminal 1 and for which the data uploading from the nearby PC 8 is necessary. Namely, the message exchanges and the data acquisition are carried out by the following steps for each application.

(Step 1) The exchange of mutual authentication messages are carried out between the wireless portable terminal and the nearby PC.

(Step 2) Name and version of application operating on the nearby PC are inquired from the wireless portable terminal and a reply is obtained.

(Step 3) Necessary setup data and input data are inquired to the nearby PC, and reply data are obtained.

(Step 4) Necessary information is extracted from the reply data and set into a prescribed memory region.

As a method for selecting target applications of this procedure, it is possible to register application programs to be set up by utilizing the nearby PC and information to be set up by utilizing the nearby PC for each application program in a form of a list information in the wireless portable terminal 1. Else, instead of carrying out the above registration, all the applications installed on the wireless portable terminal 1 may be taken as targets.

This method is effective in cases where there are many types of applications to be handled or cases where an amount of data to be set up for one application is large (although the message exchange procedure will be required at a time of activation of the individual application).

Next, the case of obtaining a plurality of application data from the nearby PC at a timing of the activation of the wireless portable terminal will be described.

When the number of applications installed on each wireless portable terminal 1 is limited, it is possible to consider a method in which the setup data for all the applications are obtained from the nearby PC and set at a timing of the activation of the wireless portable terminal 1.

Figure 14:
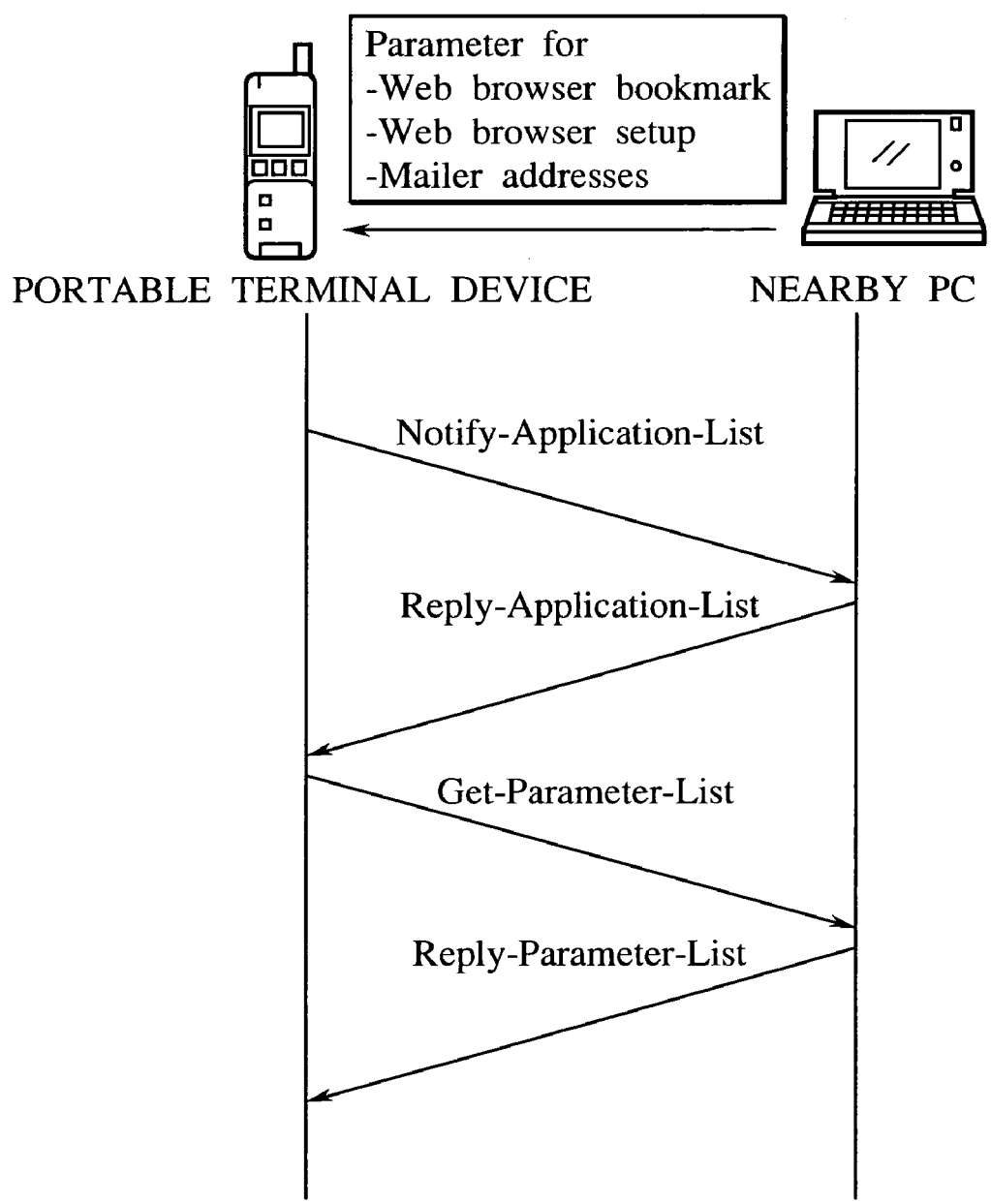
FIG. 14 is a sequence chart showing an exemplary message exchange sequence for obtaining data for a plurality of applications collectively according to one embodiment of the present invention.

FIG. 14 shows an exemplary message exchange sequence for this case, under the assumption that only the Web browser and the mail client are installed on the wireless portable terminal 1 (or only these two utilize the nearby PC).

As a method for selecting target applications of this procedure, it is possible to register application programs to be set up at a time of the activation by utilizing the nearby PC and information to be set up by utilizing the nearby PC for each application program in a form of a list information in the wireless portable terminal 1. In this example, the Web browser and the mail client are registered, and the setup parameters and the URL are registered for the Web browser while the mail address list is registered for the mail client. Else, instead of carrying out the above registration, all the applications installed on the wireless portable terminal 1 may be taken as targets.

When the wireless portable terminal 1 is activated, the procedure enters into the authentication phase similar to that in the case of FIG. 5 or FIG. 10.

When the authentication with the nearby PC 8 is completed, the wireless portable terminal 1 transmits a Notify-Application-List command in order to notify a list of applications operating on the own device to the nearby PC 8.

In response, a Reply-Application-List command attached with a program name and a version number of each application operated on the nearby PC 8 that corresponds to the notified application is received from the nearby PC 8. For example, 000 browser Ver. 3.0 and 000 mail are notified.

Here, if the corresponding application is not installed, a reply is returned by inserting a NULL field. The detail of the error processing with respect to this NULL field is system dependently defined at each system.

The wireless portable terminal 1 that obtained the reply then transmits a Get-Parameter-List command.

In response, the nearby PC 8 returns a Reply-Parameter-List command attached with the browser setup data, the URL list and the mail address list in a prescribed format of these Web browser and mail client (000 browser Ver. 3.0 and 000 mail, for example).

The wireless portable terminal 1 takes out the setup parameters, the URL list and the mail address list attached to this Reply-Parameter-List command, and stores them into the own browser and mail client setup data memories.

This procedure is effective when only the limited amount of setup data and input data are to be uploaded for a relatively few types of applications because it becomes possible to activate the applications by carrying out the uploading only once at a time of the activation of the wireless portable terminal 1 without requiring any subsequent message exchanges.

Note that it is possible to use both the method (1) for carrying out the above procedure for a plurality of application data at a timing of the activation of the wireless portable terminal and the method (2) for carrying out the above procedure for each individual application at a timing of the activation of each individual application as described above. It is also possible to carry out the above procedure at a timing of the activation of the wireless portable terminal for some one or plurality of application programs while carrying out the above procedure at a timing of the activation of each individual application for the other one or plurality of application programs.

It is also possible to enable a user to manually activate the procedure for obtaining a desired information of a desired application program from the nearby PC.

Figure 15:
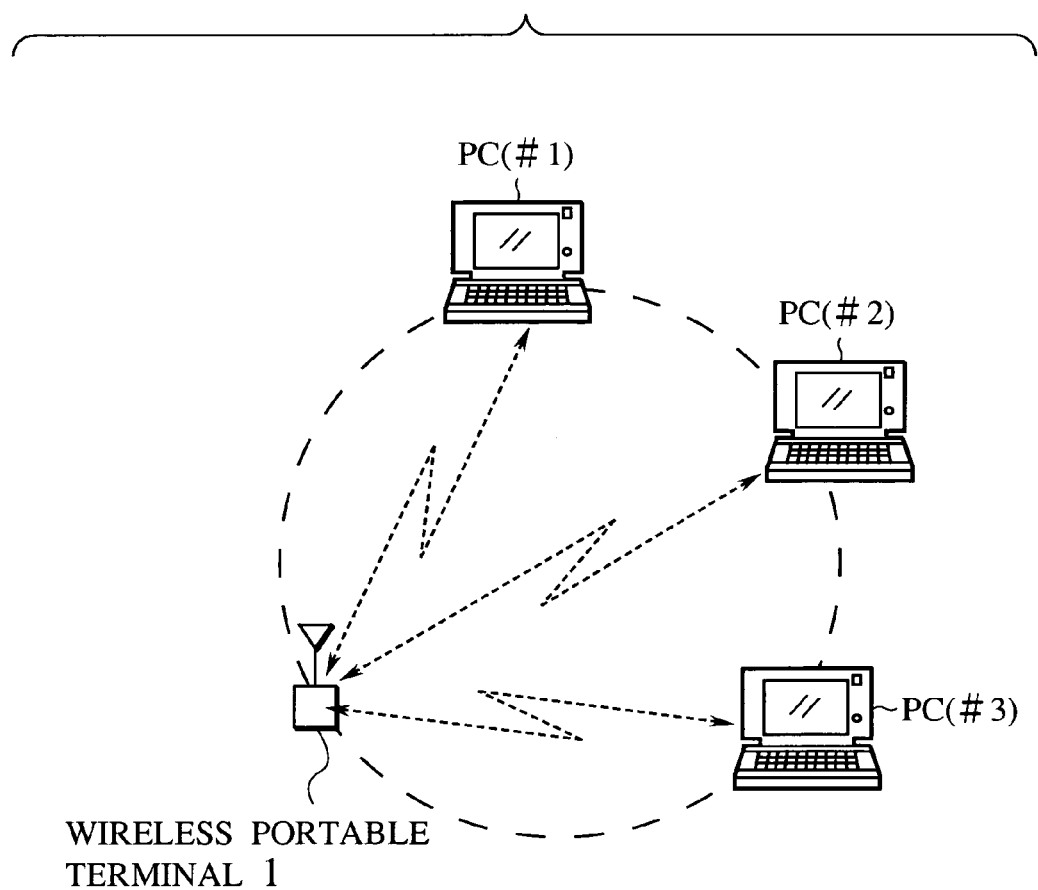
FIG. 15 is a schematic diagram showing an exemplary case where the portable terminal device carries out message exchanges with a plurality of nearby PCs according to one embodiment of the present invention.

Up to this point, the cases of cooperation with one nearby PC has been described, but in general, there are also cases where a plurality of nearby PCs and the wireless portable terminal can communicate via the local link (radio/infrared). FIG. 15 shows an exemplary case of this kind.

In this example, it is assumed that PCs #1 to #3 are capable of communicating with the wireless portable terminal 1 via the wireless LAN. It is also assumed that the authentication process between each PC and the wireless portable terminal 1 has already been completed.

Figure 16:
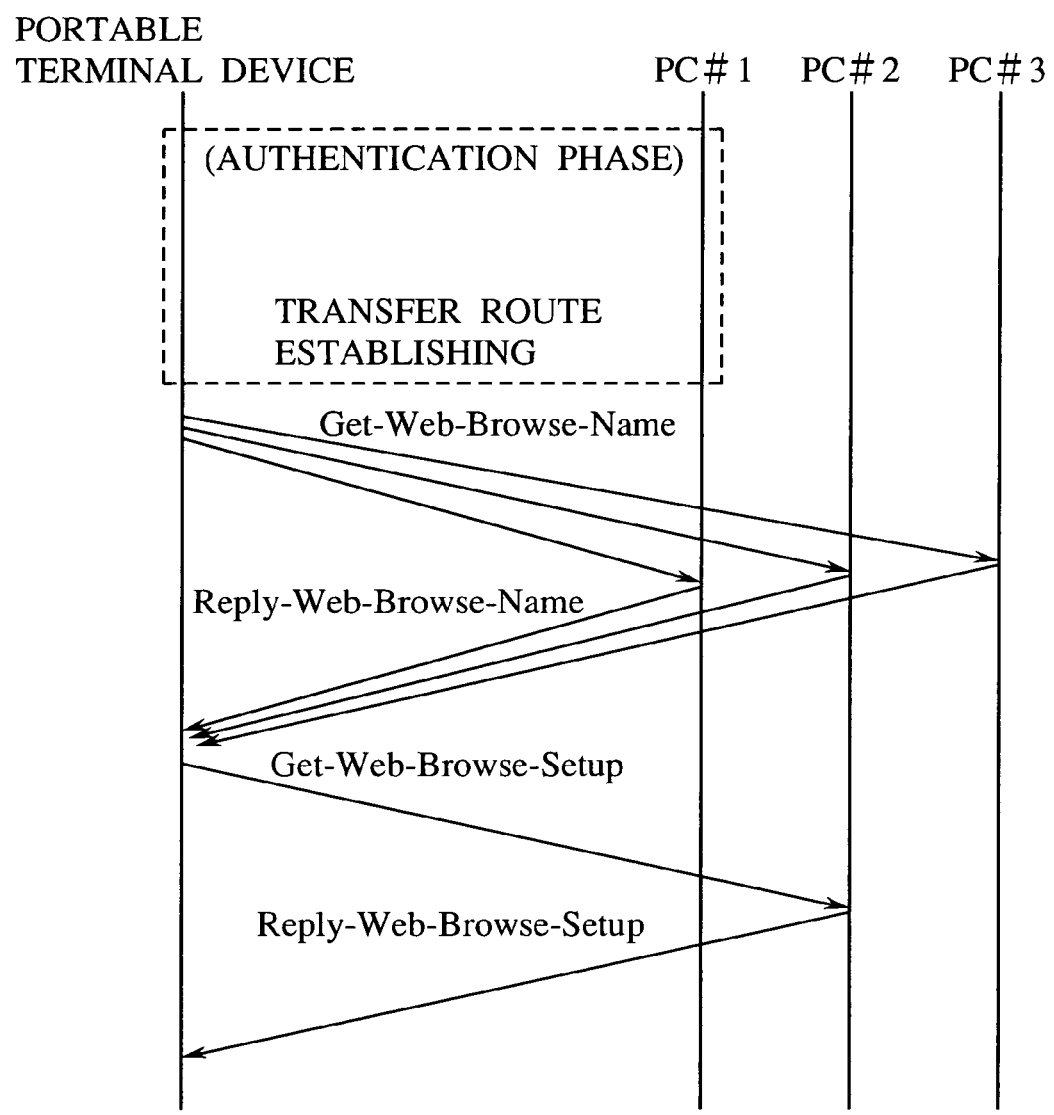
FIG. 16 is a sequence chart showing one exemplary message exchange sequence for carrying out message exchanges with a plurality of nearby PCs according to one embodiment of the present invention.

In this case, suppose that the inquiry/receiving/setup of the Web browser setup parameters as shown in FIG. 10 are to be made. FIG. 16 shows an exemplary message exchange sequence in this case.

In this case, a Get-Web-Browser-Name command is transmitted by broadcast to a plurality of nearby PCs, for example, and a Reply-Web-Browser-Name command is received from each nearby PC. Then, a PC on which the Web browser that can provide information close to the setup data of the Web browser on the wireless portable terminal 1 is installed (which is PC #2 in this example) is selected in view of each reply, and thereafter Get/Reply-Web-Browser-Setup commands are exchanged with this selected PC.

Figure 17:
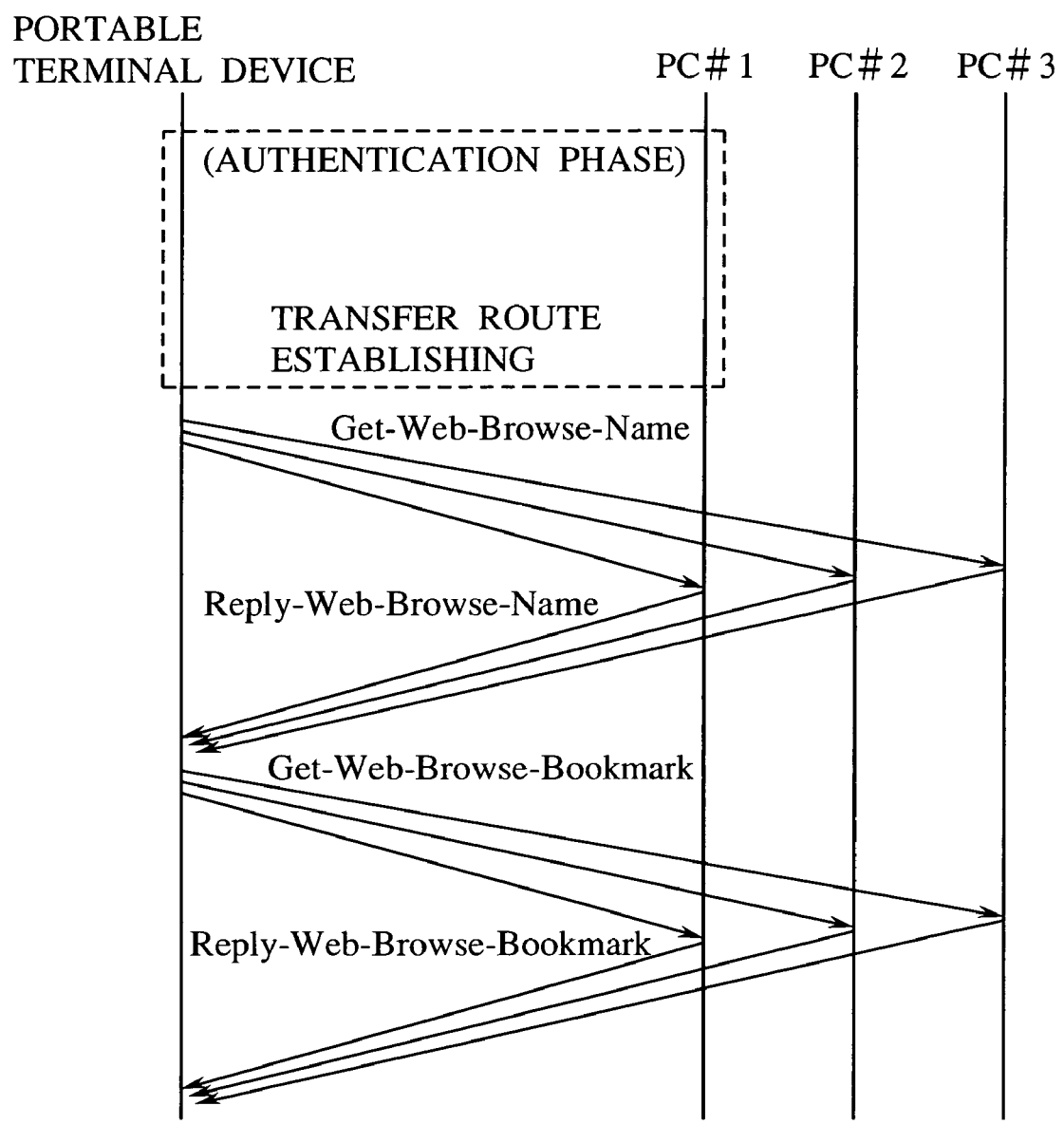
FIG. 17 is a sequence chart showing another exemplary message exchange sequence for carrying out message exchanges with a plurality of nearby PCs according to one embodiment of the present invention.

On the other hand, in the case of inquiring Bookmark data as in the case shown in FIG. 5, the inquiry is made by broadcast until the Bookmark data is actually received, and a PC that replied the Bookmark data containing a desired URL data is selected, as shown in FIG. 17.

Figure 18:
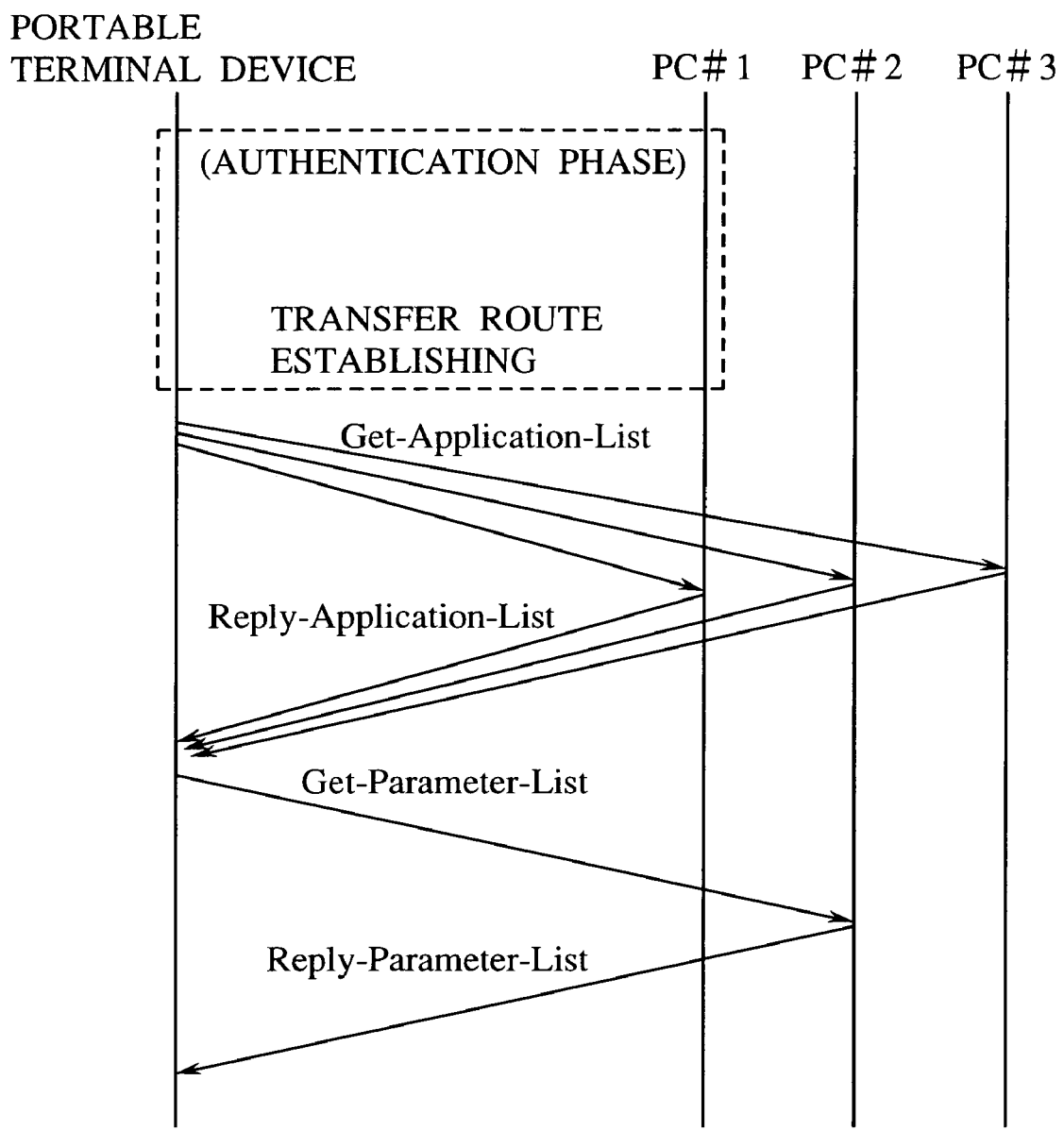
FIG. 18 is a sequence chart showing another exemplary message exchange sequence for carrying out message exchanges with a plurality of nearby PCs according to one embodiment of the present invention.

Also, in the case of collective setup as in the case shown in FIG. 14, a Notify-Application-List command is transmitted by broadcast, and a Reply-Application-List command is received from each nearby PC similarly as shown in FIG. 18. At this point, a PC on which a group of applications that are closest to those installed on the wireless portable terminal 1 are installed (which is PC #2 in this example) is selected, and thereafter the message exchanges with this selected PC are carried out.

Figure 19:
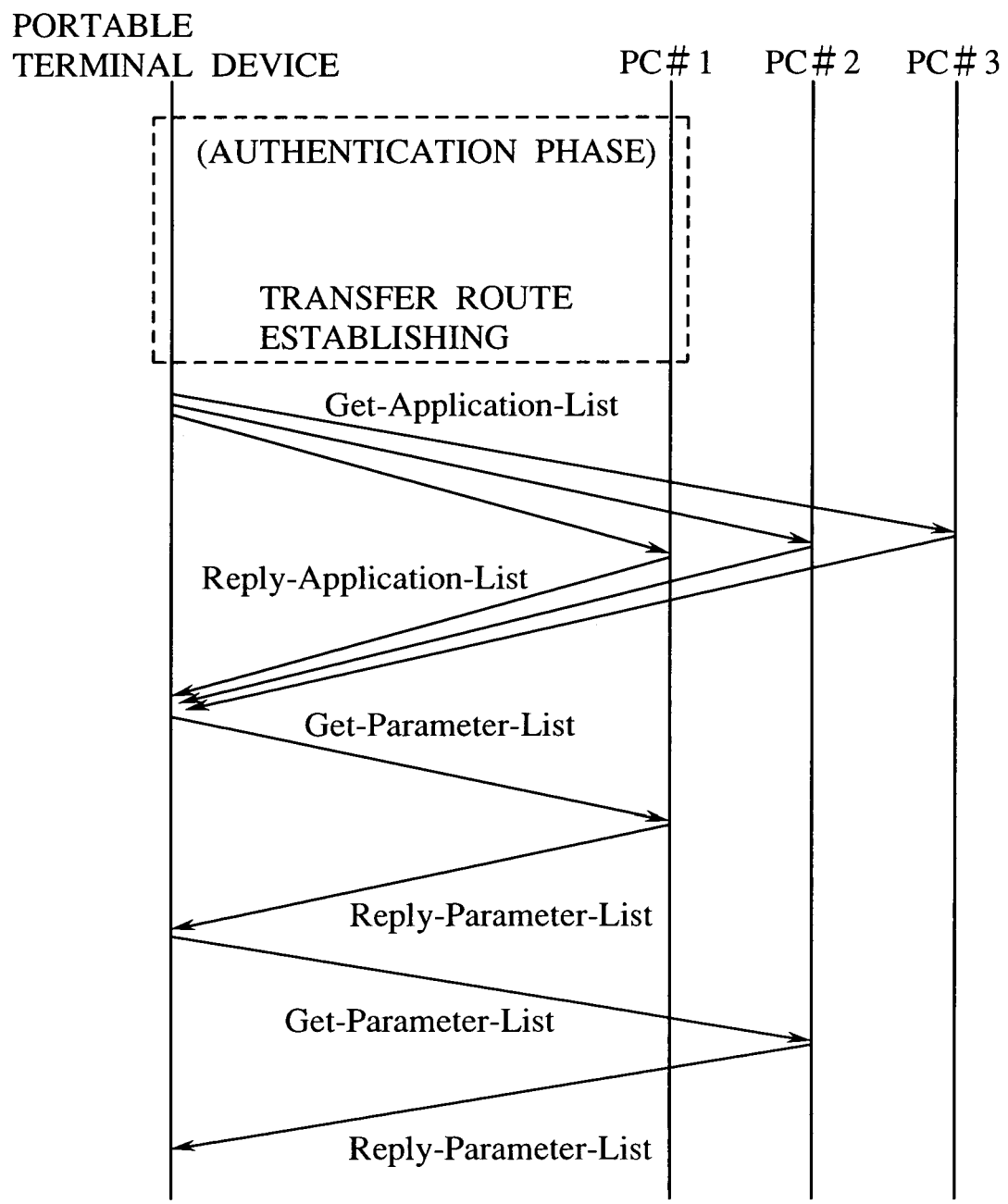
FIG. 19 is a sequence chart showing another exemplary message exchange sequence for carrying out message exchanges with a plurality of nearby PCs according to one embodiment of the present invention.

Else, as shown in FIG. 19, it is also possible to inquire desired parameter data individually from a plurality of PCs (PC #1 and PC #2 in this example) in view of the contents of the received Reply-Application-List commands.

It is also possible to assign priority orders among a plurality of nearby PCs and control to select a parameter to be selected according to the priority orders.

The above described embodiment is mainly aimed at the transfer of application setup data and input data to the wireless portable terminal 1, but the present invention can also be applied to the cooperation between the wireless portable terminal 1 and the nearby PC 8 for the other purpose. In the following, some exemplary cases of such an application of the present invention will be described.

Figure 20:
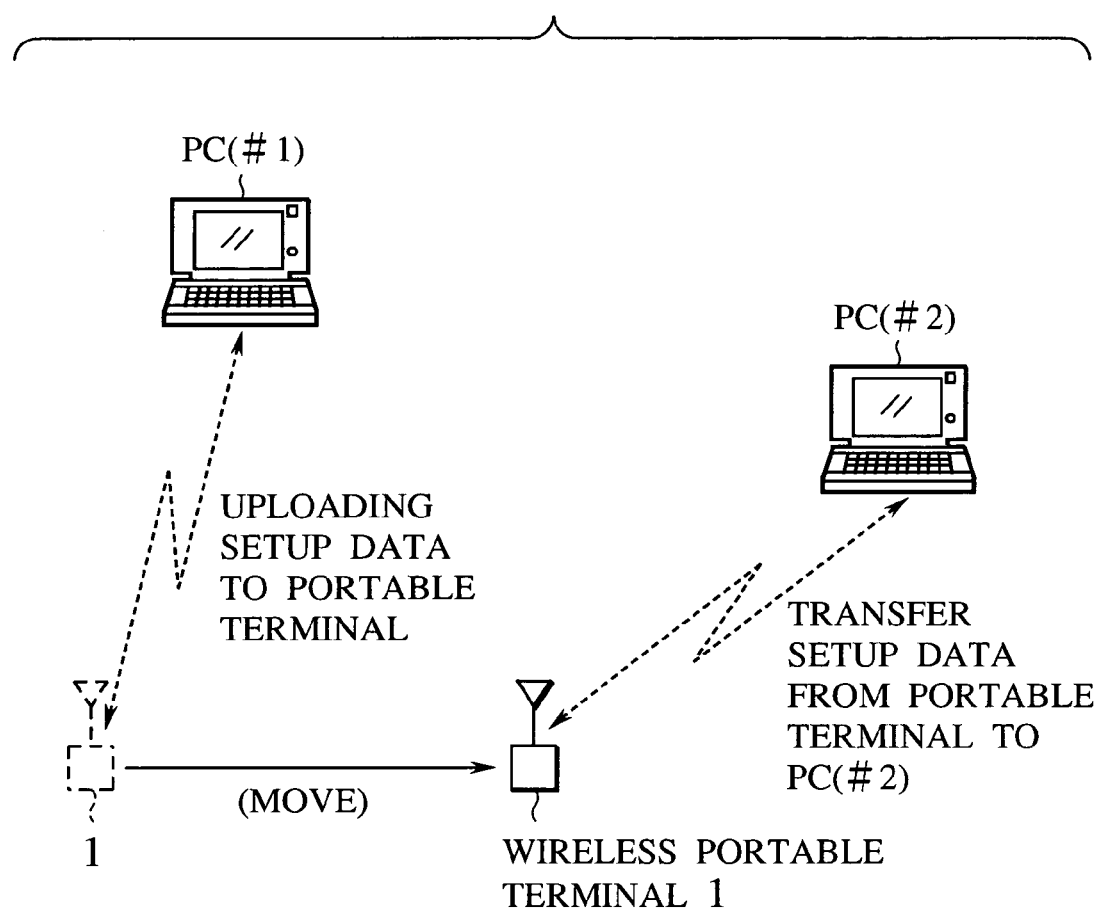
FIG. 20 is a schematic diagram showing an exemplary case of message transfer between two PCs using the portable terminal device according to one embodiment of the present invention.

For example, as shown in FIG. 20, it is possible to first upload the application setup data on a PC (#1) that is connected with the wireless portable terminal by a wireless LAN, point-to-point wireless device or infrared network, then move this wireless portable terminal 1 to another place and transfer that application setup data (as uploaded or as processed in the wireless portable terminal 1) into a PC (#2) that is connected with this wireless portable terminal 1 by a wireless LAN, point-to-point wireless device or infrared network at that another place. This is effective under a situation where PC (#1) or PC (#2) has no network connection other than the local network.

Any suitable procedure may be used for this transfer from the wireless portable terminal 1 to the PC (#2), but it is also possible to utilize the commands described above.

For instance, in the example of FIG. 9 and FIG. 10, after the wireless portable terminal 1 obtained the setup data from the PC (#1) by the procedure of FIG. 10, a prescribed authentication procedure is carried out between the wireless portable terminal 1 and the PC (#2).

Then, when the authentication procedure succeeded, the wireless portable terminal 1 transmits a Get-Web-Browser-Name command in order to obtain a program type of the Web browser on the PC (#2), and receives a Reply-Web-Browser-Name command from the PC (#2).

Then, if the same program name as the Web browser program name corresponding to the setup data obtained earlier by the own device is attached to the received command, the wireless portable terminal 1 transmits a prescribed command (Upload-Web-Browser-Setup command, for example) attached with that setup data to the PC (#2). In this case, it is known in advance that the data transfer between PC #1 and PC #2 is the main purpose, so that there is no need to set the parameters into the Web browser on the wireless portable terminal 1.

Figure 21:
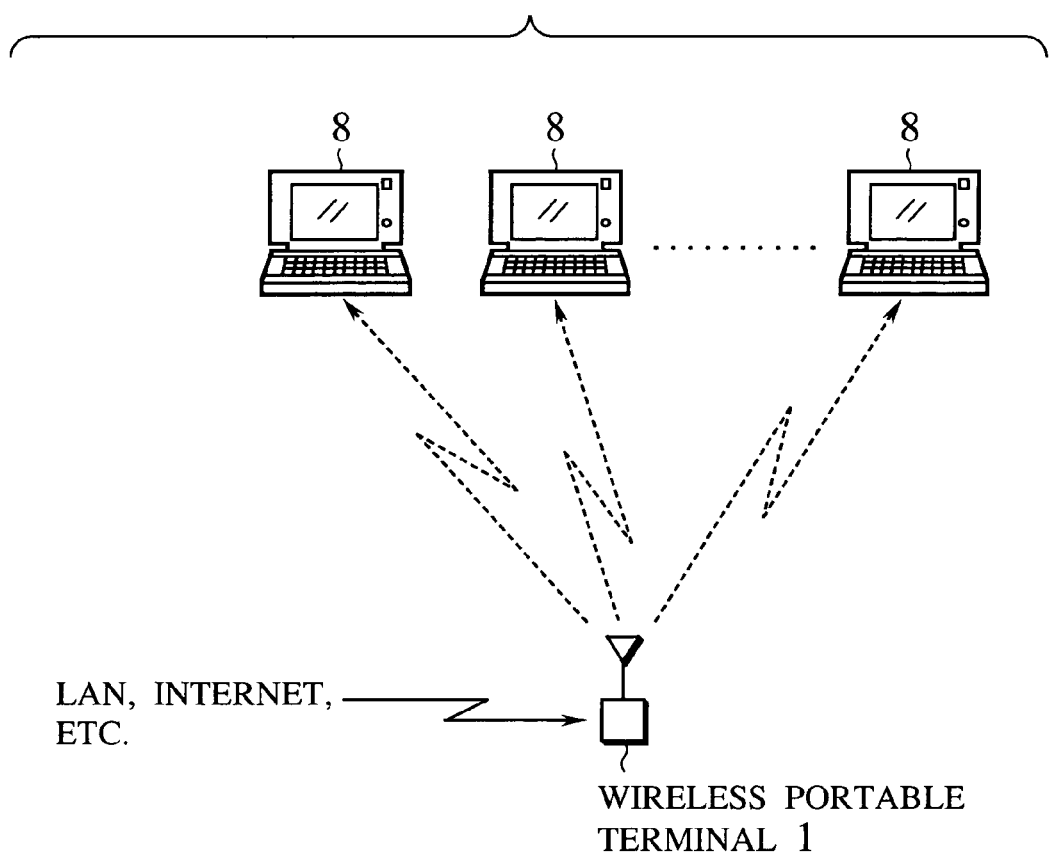
FIG. 21 is a schematic diagram showing an exemplary case of message transfer to a plurality of PCs using the portable terminal device according to one embodiment of the present invention.

It is also possible to use a configuration in which the application install/setup information is distributed to the PCs 8 by using the wireless portable terminal 1, as shown in FIG. 21, for example. In this case, the application install data or its setup information can be stored into the wireless portable terminal 1 via some network (a local network such as wireless LAN, point-to-point wireless device or infrared network, or Internet, for example) or via an input device of the wireless portable terminal 1 (such as manual input, for example), and these stored data can be installed and set up via the local network at some group of PCs located nearby the visited site.

FIG. 25 shows an exemplary internal configuration of the PC 8 in this embodiment, which operates with the wireless terminal device 1. The PC 8 has two types of network interfaces including a local network interface 82 used for the communication with the wireless device and other network interfaces 81 which are conventional network interfaces such as those for telephone line and/or Ethernet. The PC 8 also has a TCP/IP processing unit 83 connected with these network interfaces 81 and 82, and a local network command process unit 84 connected with the TCP/IP processing unit 83. The PC 8 also has application programs such as a Browser 85, a word processor 86, and a Mailer 87, each of which is connected with the TCP/IP processing unit 83 and the local network command process unit 84.

The commands from wireless devices are transferred using conventional TCP/IP protocol, but with specific data format. For example, special TCP/UDP port can be assigned for the commands, or special data types can be defined for the commands from wireless devices. In FIG. 25, it is assumed that the special data types are defined. The TCP/IP processing unit 83 sends the command to the local network command process unit 84 upon recognizing the special data type. The local network command process unit 84 parses the command and communicates with the relevant application programs, in order to return appropriate response message. When the response message is constructed, the message is sent through the TCP/IP processing unit 83 and the local network interface 82.

As described, according to this embodiment, even in a compact or very compact wireless portable terminal which has a poor input interface handling, it is possible to make input/setup of application setup data and input data easily by effectively utilizing data exchanges via the local network with the nearby PCs at the visited site. In addition, it also becomes easily possible to distribute data stored in the wireless portable terminal to the nearby PCs or transfer data between the nearby PCs by utilizing the wireless portable terminal as a temporary storage. For example, a system manager can carry around a wireless portable terminal in which the application install information is stored, and install necessary programs into each PC in each room via the local network one by one.

As described above, the present invention is directed to a communication scheme of a portable terminal device having an application program execution function, in which the portable terminal device is connected with at least one computer device via a local network, a prescribed information necessary in operating an application program (which can be almost any application program such as Web browser, Internet telephone, email handler, word processor, etc.) to be operated on the own device is obtained from a part or a whole of the connected computer devices, and a prescribed processing necessary in operating the application program is carried out on at least a part of the obtained information. Here, the prescribed information can be information which is either necessary or preferably available for the purpose of the activation or setup of the application program, or source of such an information (information that requires conversion of data format or the like in order to become utilizable, for example), for example. More specifically, this prescribed information can be given by a variety of data such as option data regarding network connection, option data regarding proxy server, Internet telephone number, email address, URL Bookmark data, option data of word processor, etc. Also, the prescribed processing can be a processing for storing the obtained information into a prescribed memory region (a memory region corresponding to the corresponding parameter, for example) as received or after the conversion of that information.

According to the present invention, it becomes possible to improve handling of a user interface or omit tedious operations in a portable terminal device by cooperating the computer device with the portable terminal device.

Also, according to the present invention, it becomes possible to realize smooth operations by cooperation with the nearby computer device even in a compact or very compact (wireless) portable terminal device on which input interface such as keyboard or mouse cannot be provided, by providing a mechanism (communication port, for example) for connection to a nearby computer device via a local network (communication mechanism such as radio/infrared, for example) in the (wireless) portable terminal device, sending data or commands regarding application program to the nearby computer device via the local network, receiving identification information, input data information, etc., of a specified application (or application that has resembling operation as the specified application) that is operating on the nearby computer device, and automatically setting the received data either as received or as processed for the own application program according to the need at the (wireless) portable terminal device.

Also, according to the present invention, it becomes possible to operate the user interface of the (wireless) portable terminal device more user friendly by uploading URL data stored in the node PC carried around by the user into the (wireless) portable terminal device whenever appropriate and caching it into the own Web browser address register for the later use, for example.

Also, according to the present invention, for the purpose of transfer of setup data between two (fixed) computers, data can be given from the first computer to the (wireless) portable terminal device via the local network once, and then the data can be given from the (wireless) portable terminal device to the second computer similarly via the local network, for example.

Also, according to the present invention, a system manager can carry around the (wireless) portable terminal device in which the application program install information is stored, and install necessary programs into each computer in each room via the local network one by one.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each of the wireless portable terminal device and the nearby computer device of the above described embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A portable terminal device, comprising:
a user interface for enabling user input into the portable terminal device;
a network connection unit configured to establish a connection to a computer network;
a local network connection unit configured to establish a connection to a local network different from the computer network, the local network being a network locally defined among the portable terminal device and at least one other computer device; and
a processing unit configured to upload a prescribed information regarding the computer network that is necessary or utilizable in operating an application program by being connected to the computer network and that is setup data or input data for the application program stored in said at least one other computer device, from said at least one other computer device connected to the portable terminal device via the local network through the local network connection unit, carry out a prescribed processing for automatically setting the setup data or the input data into the portable terminal device without requiring any user operation using the user interface, in a form utilizable by the application program on the portable terminal device, according to at least a part of the prescribed information, and execute the application program by using a result of the prescribed processing and being connected to the computer network through the network connection unit, wherein the processing unit makes a prescribed setup by storing said at least a part of the prescribed information into a prescribed memory region for the application program, either as obtained from said at least one other computer device or by converting said at least a part of the prescribed information into a format matching with the application program and/or a user interface of the portable terminal device.

2. The portable terminal device of claim 1, wherein the processing unit carries out the prescribed processing to make the prescribed setup regarding the computer network.

3. The portable terminal device of claim 1, wherein the processing unit obtains the prescribed information related to a specified type of application program that exists in said at least one other computer device.

4. The portable terminal device of claim 3, wherein the processing unit obtains the prescribed information by transmitting to said at least one other computer device via the local network a first request for obtaining an identification information for identifying said specified type of application program, receiving a reply containing the identification information from said at least one other computer device via the local network in response to the first request, transmitting to said at least one other computer device via the local network a second request for obtaining the prescribed information according to the identification information contained in the reply, and receiving the prescribed information from said at least one other computer device via the local network in response to the second request.

5. The portable terminal device of claim 1, wherein the local network enables data exchanges between the portable terminal device and said at least one other computer device by using a wireless LAN (Local Area Network), a point-to-point wireless device, or an infrared as a medium.

6. The portable terminal device of claim 1, wherein the processing unit carries out data exchanges on the local network only with a computer device that is authenticated by a prescribed mutual authentication procedure.

7. The portable terminal device of claim 1, wherein the processing unit carries out a procedure for obtaining the prescribed information for each one of a plurality of application programs installed on the portable terminal device, at a timing of activation of the portable terminal device.

8. The portable terminal device of claim 1, wherein the processing unit carries out a procedure for obtaining the prescribed information for the application program at a timing of activation of the application program.

9. The portable terminal device of claim 1, wherein the processing unit carries out a procedure for transferring the prescribed information obtained from a first computer device via the local network to a second computer connected to the local network.

10. The portable terminal device of claim 1, wherein the processing unit carries out a procedure for transferring the prescribed information obtained via the local network to one or a plurality of computer devices connected to the local network.

11. The portable terminal device of claim 1, wherein the network connection unit carries out communications via the computer network through a radio base station.

12. A computer usable medium having computer readable program codes embodied therein for causing a computer to function as a portable terminal device having a user interface for enabling user input into the portable terminal device, the computer readable program codes include:
a first computer readable program code for causing said computer to establish a connection to a computer network;
a second computer readable program code for causing said computer to establish a connection to a local network different from the computer network, the local network being a network locally defined among the portable terminal device and at least one other computer device; and
a third computer readable program code for causing said computer to upload a prescribed information regarding the computer network that is necessary or utilizable in operating an application program by being connected to the computer network and that is setup data or input data for the application program stored in said at least one other computer device, from said at least one other computer device connected to the portable terminal device via the local network, carry out a prescribed processing for automatically setting the setup data or the input data into the portable terminal device without requiring any user operation using the user interface, in a form utilizable by the application program on the portable terminal device, according to at least a part of the prescribed information, and execute the application program by using a result of the prescribed processing and being connected to the computer network, wherein the third computer readable program code makes a prescribed setup by storing said at least a part of the prescribed information into a prescribed memory region for the application program, either as obtained from said at least one other computer device or by converting said at least a part of the prescribed information into a format matching with the application program and/or a user interface of the portable terminal device.

13. The portable terminal device of claim 1, wherein the processing unit executes the application program for an Internet telephone, a web browser, an email handler or a word processor.

* * * * *